(12) United States Patent
Matsuo

(10) Patent No.: US 8,209,693 B2
(45) Date of Patent: Jun. 26, 2012

(54) SYSTEM AND METHOD FOR PROCESSING SERIES OF PROCESSES IN GIVEN ORDER HAVING PROCESSING STATUS GENERATION WITH TABLES STORING STATUS INCLUDING BEGINNING, END AND EXISTENCE SEGMENT

(75) Inventor: Hisato Matsuo, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 1155 days.

(21) Appl. No.: 12/039,412

(22) Filed: Feb. 28, 2008

(65) Prior Publication Data

US 2008/0209420 A1 Aug. 28, 2008

(30) Foreign Application Priority Data

Feb. 28, 2007 (JP) .................................. 2007-50772

(51) Int. Cl.
*G06F 9/46* (2006.01)
(52) U.S. Cl. ......... 718/103; 718/100; 718/102; 718/106
(58) Field of Classification Search .................. 718/100, 718/102, 103
See application file for complete search history.

(56) References Cited

U.S. PATENT DOCUMENTS

| | | | | |
|---|---|---|---|---|
| 5,598,388 A | * | 1/1997 | Van Maren et al. | 369/59.25 |
| 5,659,683 A | * | 8/1997 | Kawano et al. | 1/1 |
| 5,978,812 A | * | 11/1999 | Inokuchi et al. | 1/1 |
| 6,425,023 B1 | * | 7/2002 | Batchelor et al. | 710/39 |
| 6,792,504 B2 | * | 9/2004 | Hoskins et al. | 711/112 |
| 6,795,264 B2 | * | 9/2004 | Wilson | 360/69 |
| 6,856,479 B2 | * | 2/2005 | Jaquette et al. | 360/48 |
| 7,162,600 B2 | * | 1/2007 | Kano et al. | 711/162 |
| 7,970,989 B2 | * | 6/2011 | Matthews | 711/113 |
| 2004/0243760 A1 | * | 12/2004 | Dahman et al. | 711/113 |

FOREIGN PATENT DOCUMENTS

JP 05-078120 3/2005

* cited by examiner

*Primary Examiner* — Meng An
*Assistant Examiner* — Abu Z Ghaffari
(74) *Attorney, Agent, or Firm* — Gibb I.P. Law Firm, LLC; Richard M. Kotulak, Esq.

(57) ABSTRACT

Provided is a technology capable of managing the processing status of hardware blocks by a less number of registers. A processing system includes a buffer composed of a plurality of segments which store data, which is to be input to the processing system, in transactions in the order of inputting, respectively; a plurality of processing units which perform a series of processes in a given order for the data; a plurality of first tables corresponding to the plurality of processing units, respectively, the first tables each storing beginning information which indicates a beginning segment among a plurality of segments at continuous addresses completed in the process by the corresponding processing unit, end information which indicates an end segment among them, and existence information which indicates the presence or absence of segments completed in the process by the corresponding processing unit; and a management unit which manages a data transfer between the buffer and the plurality of processing units so that the series of processes are performed in a given order on the basis of the processing status of the series of processes retained in the plurality of first tables.

11 Claims, 22 Drawing Sheets

| TABLE | PROCESSING | BEGINNING INFORMATION | END INFORMATION | EXISTENCE INFORMATION |
|---|---|---|---|---|
| 181 FIRST TABLE | HOST TRANSFER (FIRST PROCESSING UNIT) | SEGMENT 3 | SEGMENT 8 | 1 |
| 182 FIRST TABLE | DSIT ADDITION (SECOND PROCESSING UNIT) | SEGMENT 3 | SEGMENT 6 | 1 |
| 183 FIRST TABLE | ECC ADDITION (THIRD PROCESSING UNIT) | SEGMENT 3 | SEGMENT 5 | 1 |
| 184 FIRST TABLE | TAPE TRANSFER (FOURTH PROCESSING UNIT) | SEGMENT 3 | SEGMENT 4 | 1 |

FIG. 4A

| | FIRST PROCESSING UNIT | SECOND PROCESSING UNIT | THIRD PROCESSING UNIT | FOURTH PROCESSING UNIT |
|---|---|---|---|---|
| SEGMENT 0 | 0 | 0 | 0 | 0 |
| SEGMENT 1 | 0 | 0 | 0 | 0 |
| SEGMENT 2 | 0 | 0 | 0 | 0 |
| SEGMENT 3 | 1 | 1 | 1 | 1 |
| SEGMENT 4 | 1 | 1 | 1 | 1 |
| SEGMENT 5 | 1 | 1 | 1 | 0 |
| SEGMENT 6 | 1 | 1 | 0 | 0 |
| SEGMENT 7 | 1 | 0 | 0 | 0 |
| SEGMENT 8 | 1 | 0 | 0 | 0 |
| SEGMENT 9 | 0 | 0 | 0 | 0 |

FIG. 4B

| TABLE | BEGINNING INFORMATION | END INFORMATION | EXISTENCE INFORMATION |
|---|---|---|---|
| 185 SECOND TABLE | SEGMENT 9 | SEGMENT 2 | 1 |

FIG. 4C

| REGISTER | ADDRESS | BIT | NAME | DESCRIPTION |
|---|---|---|---|---|
| RBSR0 | x1A14 | [15:08]<br>[07:00] | RBSR 16N+1<br>RBSR 16N | □ RBSR body, same as Conventional RBSR<br>□ N = RBSRWIN [5:0] |
| RBSR1 | x1A18 | [15:08]<br>[07:00] | RBSR 16N+3<br>RBSR 16N+2 | □ bit 0: IBC (EVEN IBC1, ODD IBC2, AND TAPE TRANSFER) ENDS<br>□ bit 1: C2ECC ENDS<br>□ bit 2: DSIT ENDS |
| RBSR2 | x1A1C | [15:08]<br>[07:00] | RBSR 16N+5<br>RBSR 16N+4 | □ bit 3: COMPRESSION (ELDC AND HOST TRANSFER) ENDS<br>□ bit 4: IBC2 IS BEING EXECUTED FOR THE APPROPRIATE SEGMENT |
| RBSR3 | x1A20 | [15:08]<br>[07:00] | RBSR 16N+7<br>RBSR 16N+6 | □ bit 5: IBC1 IS BEING EXECUTED FOR THE APPROPRIATE SEGMENT<br>□ bit 6: C2ECC IS BEING EXECUTED FOR THE APPROPRIATE SEGMENT<br>□ bit 7: COMPRESSION (ELDC) IS BEING EXECUTED FOR THE APPROPRIATE SEGMENT] |
| RBSR4 | x1A24 | [15:08]<br>[07:00] | RBSR 16N+9<br>RBSR 16N+8 | |
| RBSR5 | x1A28 | [15:08]<br>[07:00] | RBSR 16N+11<br>RBSR 16N+10 | |
| RBSR6 | x1A2C | [15:08]<br>[07:00] | RBSR 16N+13<br>RBSR 16N+12 | |
| RBSR7 | x1A30 | [15:08]<br>[07:00] | RBSR 16N+15<br>RBSR 16N+14 | |
| VRBSRE | x1AE0 | [31]<br>[25:16]<br>[09:00] | ELDC_EXIST<br>ELDC_BSEG<br>ELDC_ESEG | □ FIRST TABLE FOR VRBSR<br>(HOST TRANSFER/DSIT ADDITION/C2ECC ADDITION/TAPE TRANSFER)<br>□ SEGMENT COUNTER FOR SEGMENT HAVING INIT_SCNT INITIAL STATUS |
| VRBSRM | x1AE4 | [31]<br>[25:16]<br>[09:00] | DSIT_EXIST<br>DSIT_BSEG<br>DSIT_ESEG | □ IN INITIAL STATE, ELDC_EXIST='0', ELDC_BSEG=x00, AND ELDC_BSEG=x00<br>SAME APPLIES TO DSIT, C2EC, AND IBCX.<br>INIT_EXIST='1', INIT_SCNT= |
| VRBSRC | x1AE8 | [31]<br>[25:16]<br>[09:00] | C2EC_EXIST<br>C2EC_BSEG<br>C2EC_ESEG | □ IF THE HOST TRANSFER (ELDC) ENDS FOR A CERTAIN SEGMENT,<br>ELDC_EXIST='1'<br>ELDC_BSEG="NUMBER OF BEGINNING SEGMENT"<br>ELDC_ESEG="NUMBER OF END SEGMENT" |
| VRBSRI | x1AEC | [31]<br>[25:16]<br>[09:00] | IBCX_EXIST<br>IBCX_BSEG<br>IBCX_ESEG | □ ONLY ONE SEGMENT EXISTS AS EACH OF THE BEGINNING SEGMENT AND THE END SEGMENT |
| VRBSRZ | x1AF0 | [31]<br>[10:00] | INIT_EXIST<br>INIT_SCNT | |

FIG. 5

|  | CASE 1 | CASE 2 | CASE 3 | CASE 4 | CASE 5 |
|---|---|---|---|---|---|
| SEGMENT 0 | - | - | - | - | - |
| SEGMENT 1 | - | - | - | - | - |
| SEGMENT 2 | - | B | B | B | B |
| SEGMENT 3 | - | X | X | X | X |
| SEGMENT 4 | - | X | X | X | X |
| SEGMENT 5 | - | E | E | E | E |
| SEGMENT 6 | - | - | - | - | - |
| SEGMENT 7 | - | - | - | - | - |

FIG. 9A

|  | BEGINNING INFORMATION | END INFORMATION | EXISTENCE INFORMATION |
|---|---|---|---|
| CASE 1 | 0 | 0 | 0 |
| CASE 2 | 2 | 5 | 1 |
| CASE 3 | 2 | 5 | 1 |
| CASE 4 | 2 | 5 | 1 |
| CASE 5 | 2 | 5 | 1 |

FIG. 9B

|  | BEGINNING INFORMATION | END INFORMATION | EXISTENCE INFORMATION |
|---|---|---|---|
| CASE 1 | 2 | 2 | 1 |
| CASE 2 | 1 | 5 | 1 |
| CASE 3 | 2 | 6 | 1 |
| CASE 4 | 2 | 5 | 1 |
| CASE 5 | 2 | 5 | 1 |

FIG. 9C

|  | CASE 1 | CASE 2 | CASE 3 | CASE 4 | CASE 5 |
|---|---|---|---|---|---|
| SEGMENT 0 | - | - | - | - | - |
| SEGMENT 1 | - | - | - | - | - |
| SEGMENT 2 | BE | B | B | B | B |
| SEGMENT 3 | - | X | X | X | X |
| SEGMENT 4 | - | X | X | X | X |
| SEGMENT 5 | - | E | E | E | E |
| SEGMENT 6 | - | - | - | - | - |
| SEGMENT 7 | - | - | - | - | - |

FIG. 11A

|  | BEGINNING INFORMATION | END INFORMATION | EXISTENCE INFORMATION |
|---|---|---|---|
| CASE 1 | 2 | 2 | 1 |
| CASE 2 | 2 | 5 | 1 |
| CASE 3 | 2 | 5 | 1 |
| CASE 4 | 2 | 5 | 1 |
| CASE 5 | 2 | 5 | 1 |

FIG. 11B

|  | BEGINNING INFORMATION | END INFORMATION | EXISTENCE INFORMATION |
|---|---|---|---|
| CASE 1 | 0 | 0 | 0 |
| CASE 2 | 3 | 5 | 1 |
| CASE 3 | 2 | 4 | 1 |
| CASE 4 | 2 | 5 | 1 |
| CASE 5 | 2 | 5 | 1 |

FIG. 11C

|  | FIRST PROCESSING UNIT | SECOND PROCESSING UNIT | THIRD PROCESSING UNIT | FOURTH PROCESSING UNIT |
|---|---|---|---|---|
| SEGMENT n-3 | 1 | 1 | 1 | 1 |
| SEGMENT n-2 | 1 | 1 | 1 | 1 |
| SEGMENT n-1 | 0 | 0 | 0 | 0 |
| SEGMENT n | 0 | 0 | 0 | 0 |
| SEGMENT n+1 | 1 | 1 | 1 | 1 |

FIG. 14A

|  | FIRST PROCESSING UNIT | SECOND PROCESSING UNIT | THIRD PROCESSING UNIT | FOURTH PROCESSING UNIT |
|---|---|---|---|---|
| SEGMENT n-3 | 1 | 1 | 1 | 1 |
| SEGMENT n-2 | 1 | 1 | 1 | 1 |
| SEGMENT n-1 | 0 | 0 | 0 | 0 |
| SEGMENT n | 0 | 0 | 0 | 0 |
| SEGMENT n+1 | 0 | 0 | 0 | 0 |

FIG. 14B

|  | FIRST PROCESSING UNIT | SECOND PROCESSING UNIT | THIRD PROCESSING UNIT | FOURTH PROCESSING UNIT |
|---|---|---|---|---|
| SEGMENT n-3 | 1 | 1 | 1 | 1 |
| SEGMENT n-2 | 1 | 1 | 1 | 1 |
| SEGMENT n-1 | 0 | 0 | 0 | 0 |
| SEGMENT n | 0 | 1 | 1 | 1 |
| SEGMENT n+1 | 0 | 0 | 0 | 0 |

FIG. 14C

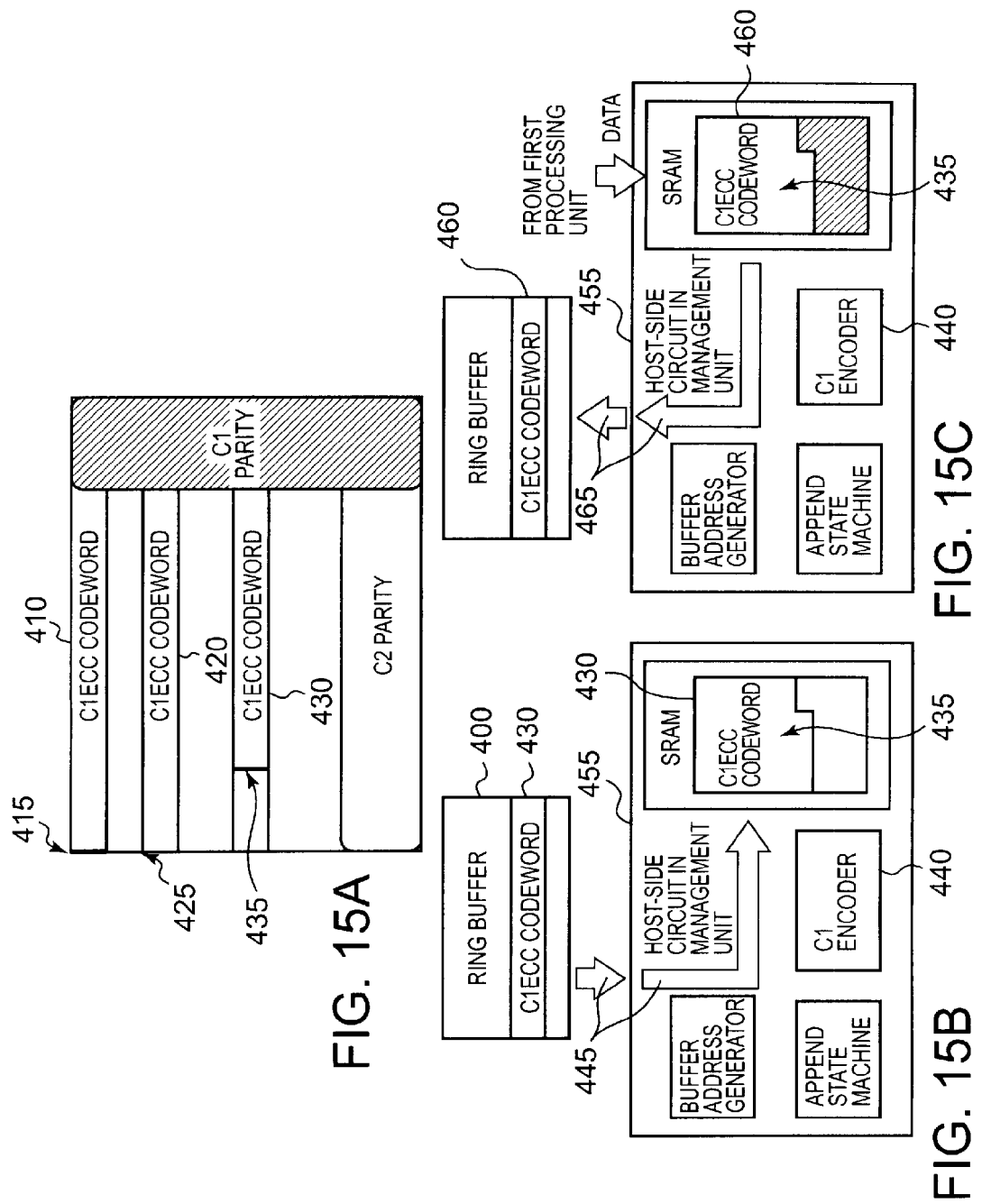

SYSTEM AND METHOD FOR PROCESSING SERIES OF PROCESSES IN GIVEN ORDER
HAVING PROCESSING STATUS
GENERATION WITH TABLES STORING
STATUS INCLUDING BEGINNING, END AND
EXISTENCE SEGMENT

CROSS-REFERENCE TO RELATED
APPLICATIONS

This application is related to Japan Patent Application No. 2007-50772, filed Feb. 28, 2007.

BACKGROUND OF THE INVENTION

The present invention relates to a method for performing a series of processes in a given order for data input to a system, and particularly to a technology for managing the processing status of a series of processes for unit data stored in a plurality of segments that constitute a buffer, respectively.

A storage device such as a tape drive performs a lot of processes including adding ID information or an error correction code to unit data before it records input data sent from a host device into a storage medium in given units. The series of processes are performed in a given order by hardware and the blocks of the hardware use a common buffer as a work area for the processes. The buffer is used as a ring buffer composed of a plurality of areas (hereinafter, referred to as segments) and the unit data are stored in the segments. Although the blocks operate independently, their processing statuses are managed by registers so that the blocks can determine the start of a process for the next segment by themselves and the processing statuses are shared by the blocks.

As a conventional technology for managing a data transfer between a plurality of processing circuits and a memory unit containing a plurality of memories on the basis of state information in a processing system which performs a series of processes in a given order, there is, for example, a technology of passing data between pipeline stages by switching data paths between the plurality of processing circuits and the plurality of memories in the memory unit according to given state information. As the state information, there is used information which changes from a processing status of at least one processing circuit among the plurality of processing circuits.

SUMMARY OF THE INVENTION

One embodiment of the present invention includes a processing system. The processing system includes a buffer composed of a number of segments which store data, which is to be input to the processing system, in transactions in the order of inputting, respectively. The processing system also includes a number of processing units which perform a series of processes in a given order for the data. The processing system also includes a number of first tables corresponding to the number of processing units, respectively, the first tables each storing beginning information which indicates a beginning segment among a number of segments at continuous addresses completed in the process by the corresponding processing unit, end information which indicates an end segment among them, and existence information which indicates the presence or absence of segments completed in the process by the corresponding processing unit. The processing system also includes a management unit which manages a data transfer between the buffer and the number of processing units so that the series of processes are performed in the given order on the basis of the processing status of the series of processes retained in the number of first tables.

In another embodiment the present invention includes a storage device. The storage device includes a storage medium capable of writing and reading data in given units. The storage device includes a buffer composed of a number of segments each of which stores unit data in the given units in a writing or reading order before writing into the storage medium or after reading from the storage medium. The storage device includes a number of processing units which perform a series of processes, preferably, in a given order for the unit data. The storage device includes a number of first tables corresponding to the number of processing units, respectively, the first tables each storing beginning information which indicates a beginning segment among a number of segments at continuous addresses completed in the process by the corresponding processing unit, end information which indicates an end segment among them, and existence information which indicates the presence or absence of segments completed in the process by the corresponding processing unit. The storage device includes a management unit which manages a data transfer between the buffer and the number of processing units so that the series of processes are performed, preferably, in the given order on the basis of the processing status of the series of processes retained in the number of first tables.

In yet another embodiment the present invention includes a method for performing a series of processes for unit data stored in segments of a buffer, preferably, in a given order, wherein each of the number of processing units performing the series of processes has a corresponding first table which stores beginning information which indicates a beginning segment among a number of segments at continuous addresses completed in the process by the processing unit, end information which indicates an end segment among them, and existence information which indicates the presence or absence of segments completed in the process by the processing unit. The method includes generating the processing status of a next segment to be processed for each of the number of processing units with reference to the number of first tables. The method includes determining whether the processing status of the next segment to be processed satisfies a start condition on the process by each of the processing units. The method includes reading the unit data from the next segment to be processed of the buffer and transferring it to the processing unit for which the start condition is determined in response to the determination that the start condition on the process is satisfied in the determination step.

BRIEF DESCRIPTION OF THE DRAWINGS

FIG. 4A is a diagram showing an example of a plurality of first tables according to the present invention, FIG. 4B is a diagram showing a conventional equal number of status registers to the number of segments corresponding to FIG. 4A, and FIG. 4C is a diagram showing an example of a second table according to the present invention;

FIG. 5 is a diagram showing an example of pointer view registers and a segment view register according to the present invention;

FIG. 9A is a diagram showing an example of a processing status of a plurality of segments when a process complete status is set anew, FIG. 9B is the first table before updating, and FIG. 9C is the first table after updating;

FIG. 11A is a diagram showing an example of a processing status of a plurality of segments when clearing the process complete status, FIG. 11B is the first table before updating, and FIG. 11C is the first table after updating;

FIG. 14A is a diagram showing an example of a case where process complete statuses are discontinuous when overwriting is performed, FIG. 14B is a diagram showing an example of a case where process complete statuses are discontinuous when overwriting is performed, and FIG. 14C is a diagram showing an example of a case where process complete statuses are discontinuous when overwriting is performed;

FIG. 15A is a diagram showing data protected by a two-dimensional ECC, FIG. 15B is a diagram showing preprocessing before overwriting, and FIG. 15C is a diagram showing the overwriting;

DETAILED DESCRIPTION

While the preferred embodiments of the present invention will be described in detail hereinafter with reference to accompanying drawings, it is to be understood that the following embodiments are not intended to limit the invention according to the claims, and all of the combinations of features described in the embodiments are not always essential to the solving means of the invention.

The following describes an embodiment of the invention, taking a tape drive conforming to the Linear Tape Open (LTO) standard as an example. The LTO standard is an open format standard jointly developed by Hewlett-Packard, IBM, and Quantum. Therefore, before starting to describe the present invention concretely, the following describes a series of processes before data writing in the LTO tape drive and a conventional method of managing the processing status of a series of processes using the equal number of registers to the number of segments, with reference to FIG. 1 and FIG. 2.

The processes before data writing in the LTO tape drive can be divided into two types of processes: a back-end process for processing data from the host device to a data set which is unit data handled in the LTO tape drive and a front-end process for modulating the data set to a bit stream which is written into the tape actually. This specification describes a series of back-end processes.

Figure 1:
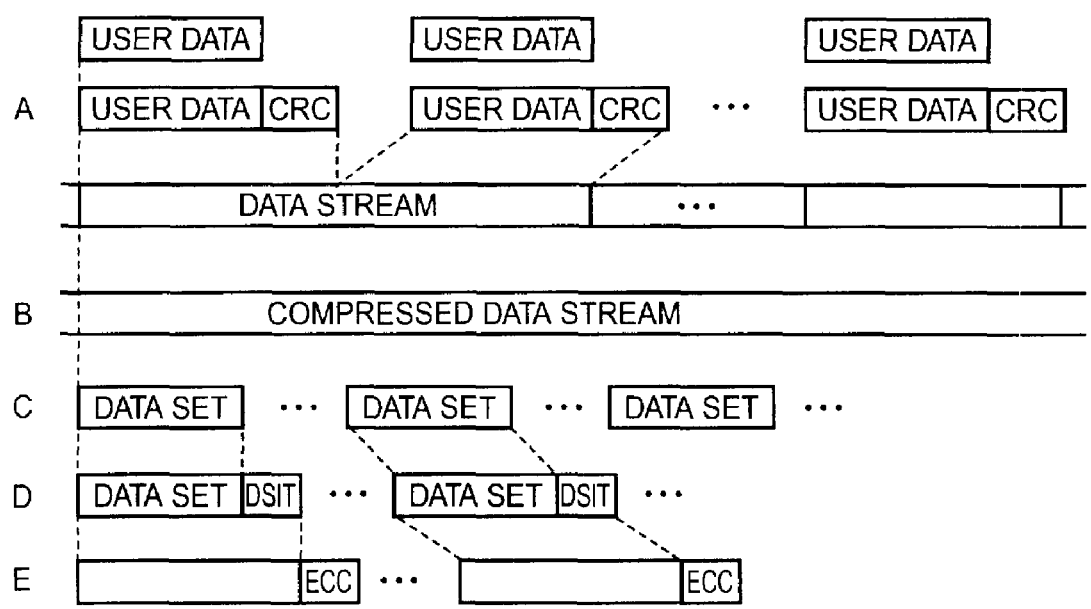
FIG. 1 is a diagram showing data formats in various stages of a series of processes of an LTO tape drive.

FIG. 1 shows data formats in the respective stages of the series of processes. After user data is transmitted from the host device, first, an error correction code (hereinafter, referred to as CRC) is calculated for the user data and then added to the user data (See A in FIG. 1). Thereafter, the user data with the CRC appended is compressed (See B in FIG. 1). The compressed data is collected in the form of data in units handled in the LTO tape drive and stored in a buffer (See C in FIG. 1). In the LTO tape drive, data is recorded in a tape medium in units referred to as "data sets." Therefore, the buffer is divided by the data set size, in other words, divided into segments each having about two megabytes, and is used as a ring buffer.

Subsequently, information indicating the content of the data set, which is referred to as "data set information table (DSIT)," is generated for the data of each segment and is stored in the same segment as for the corresponding data (See D in FIG. 1). Since DSIT includes various information such as a data set number and the number of user data included therein, DSIT is generated by a microcode or firmware which directly manages the hardware. Finally, DSIT is added to the data and an error correcting code (hereinafter, referred to as ECC) is calculated and added to the data (See E in FIG. 1). At this point, the data set comes to completion. Thereafter, the completed data set is transmitted to the front-end.

Figures 2A, 2B:
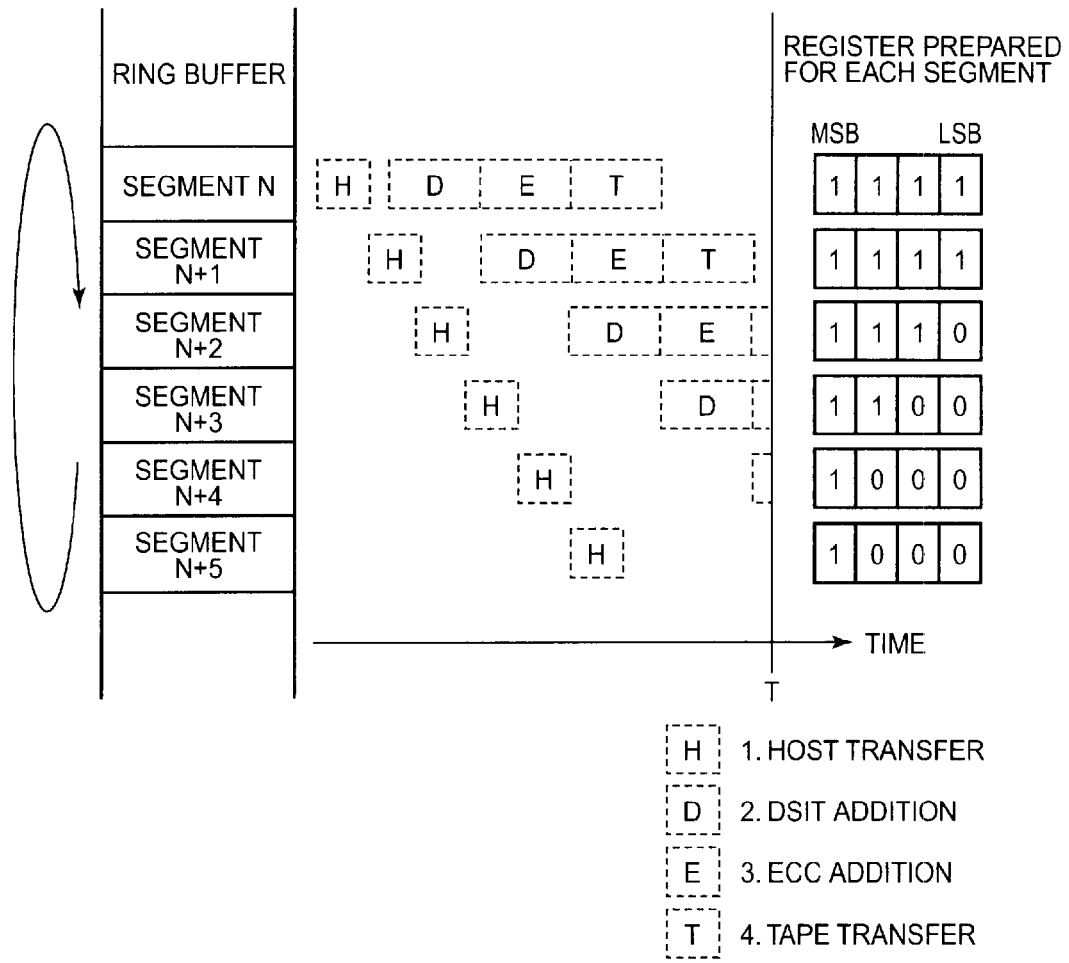
FIG. 2A is a diagram showing a conventional status management method of a series of processes using an equal number of registers to the number of segments and FIG. 2B is a diagram showing a register bit allocation in the conventional status management method.

Referring to FIG. 2A, there is shown a conventional method of managing the processing status of a series of processes using an equal number of registers to the number of segments. In this description, a register having a 4-bit width is prepared for one segment, which retains the respective process complete statuses of four processes. The four processes includes: 1. a process of collecting the data transmitted from the host device in transactions and storing them in the buffer; 2. a process of generating DSIT and adding it to the data; 3. a process of calculating ECC and adding it to the data; and 4. a process of transferring the completed data set to the front-end to record it in a tape.

FIG. 2B shows a bit allocation to the four processes. The host transfer at 1, the DSIT addition at 2, the ECC addition at 3, and the tape transfer at 4 are allocated to the bits sequentially from the leftmost bit (MSB). Each of the bits is set to 0 in an initial state and set to 1 by hardware when the corresponding process terminates. The bit for the DSIT addition at 2, however, is set by a microcode. A register with all bits set is cleared by the microcode before new data is written into the corresponding segment.

In FIG. 2A, the above processes at 1 to 4 are performed sequentially from the data set stored in segment N of the ring buffer. The segment N all of whose processes are completed and the registers corresponding to segment N+1 have all bits set to 1. For segment N+2, the processes are completed until the ECC addition at 3 and therefore the most significant bit to bit 1 are set to 1 for the corresponding register. Much the same is true for other segments and the respective bits of the register are set in such a way as to indicate how far the series of processes are completed for the corresponding segment.

In this manner, the equal number of registers to the number of segments have conventionally been required to manage the processing status of the respective stages of the series of processes for each segment. Therefore, it is an object of the present invention to manage the same information by a less number of registers. As described above, the series of processes are performed sequentially from the segment N to segment N+5. Therefore, observing the registers of the segments regarding the same process, the corresponding bits change between successive values.

For example, regarding the process of the DSIT addition at 2, bit 2 of the corresponding register remains at 1 from the segment N to segment N+3 and remains at 0 from segment N+4 to the segment N+5. Regarding the process of the ECC addition at 3, bit 1 of the corresponding register remains at 1 from the segment N to the segment N+2 and remains 0 from the segment N+3 to the segment N+5. Therefore, it is understood that it is possible to obtain information of the same content as in the case where the processing status of the respective stages of the series of processes is managed for each segment only by retaining the information on the beginning segment and the end segment with flags set. A new register according to the present invention as an alternative to the conventional register for each segment will be described in detail later with reference to FIG. 4.

Figure 3:
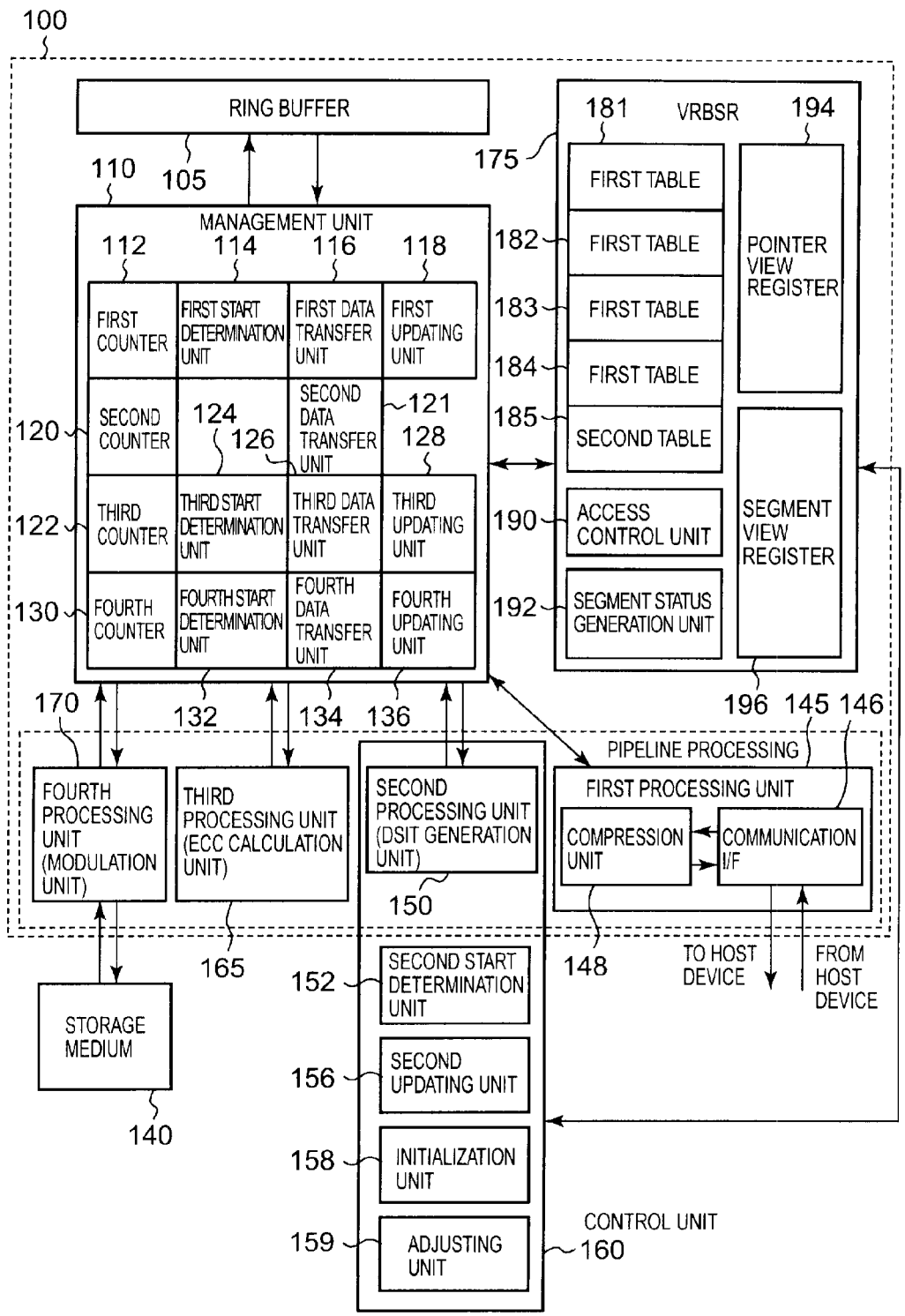
FIG. 3 is a diagram showing an example of a configuration of a processing system 100 according to a first embodiment of the present invention.

Referring to FIG. 3, there is shown an example of the configuration of a processing system 100 which performs the series of processes in a given order according to a first embodiment of the present invention. In this embodiment, a ring buffer is used as a common work area of the series of processes. The processing system 100 includes a ring buffer 105, a management unit 110, a first processing unit 145, a second processing unit 150, a third processing unit 165, and a fourth processing unit 170, which perform the series of processes in the given order for data which is input to the processing system 100, and a virtual ring buffer status register (hereinafter, referred to as VRBSR) 175. The processing system 100 according to this embodiment is assumed to be mounted on a storage device, and FIG. 3 shows a control unit 160, which controls the entire storage device, and a storage medium 140. It is assumed here that the storage device is an LTO tape drive and that the series of processes are performed by the four processing units. The number of processing units, however, is not limited to four as is apparent to those skilled in the art.

Figure 22:
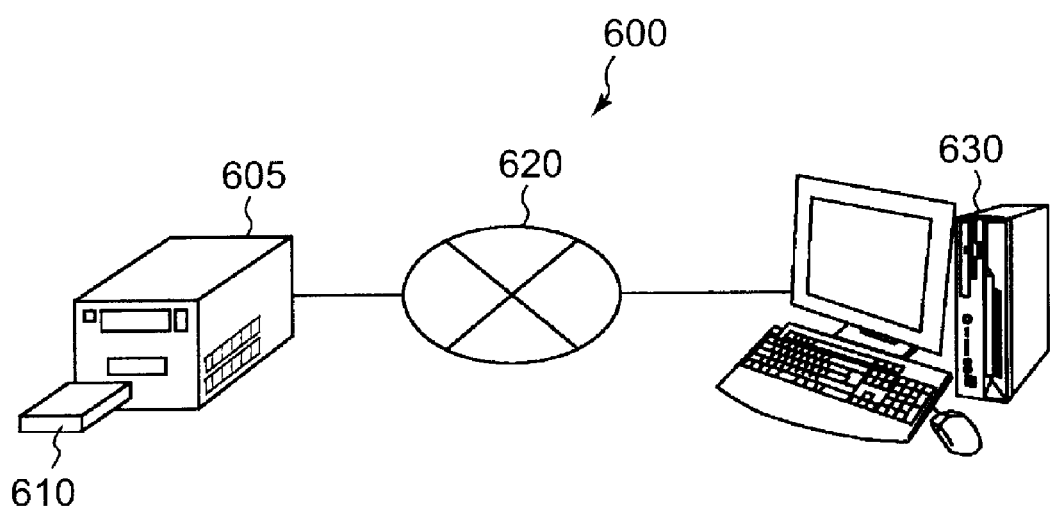
FIG. 22 is a diagram showing an example of a system configuration including a storage device according to the present invention and a host device.

An LTO tape drive 605 is, as shown in FIG. 22, connected to a host device 630 via an interface such as an SCSI interface, a fiber channel, or an SAS. The LTO tape drive 605 and the host device 630 can also be connected to each other via a network 620 such as a dedicated line. In addition, the LTO tape drive 605 can be connected to an information processing apparatus such as a personal computer via an SCSI interface or other communication interfaces and then connected to the network 620 via the information processing apparatus.

In the processing system 100 as described above, data transmitted from the host device is received by the LTO tape drive, processed by the first processing unit 145, the second processing unit 150, the third processing unit 165, and the fourth processing unit 170, which use the ring buffer 105 as a work area, in this order, and finally recorded into the storage medium 140 in data writing. In data reading, the data is read from the storage medium 140, processed by the above-described plurality of processing units, which use the ring buffer 105 as a work area, in an order reverse to that in data writing, and finally transmitted to the host device.

The first processing unit 145 includes a communication interface 146 and a compression unit 148. In data writing, the communication interface 146 receives user data from the host device, appends a CRC to the user data, and transmits it to the compression unit 148. Then, the compression unit 148 compresses the user data with the CRC appended and transmits the compressed data to the management unit 110 in order to store it in the ring buffer 105. In data reading, the compression unit 148 extends the compressed data transferred from the ring buffer 105 via the management unit 110 and transmits it to the communication interface 146. Then, the communication interface 146 receives the data from the compression unit 148, checks the CRC, and transmits the user data to the host device.

The second processing unit 150 functions as a DSIT generation unit in data writing and generates DSIT for the data in transactions read from the ring buffer 105 via the management unit 110. The generated DSIT is added to a segment of the ring buffer 105 in which the corresponding data is stored via the management unit 110. The second processing unit 150 checks DSIT added to the data transferred from the segment of the ring buffer 105 via the management unit 110 in data reading. As described above, the DSIT process is performed by a microcode, unlike the processes of the first processing unit 145, the third processing unit 165, and the fourth processing unit 170, which are implemented as hardware. In other words, the second processing unit 150 is included in the control unit 160 which controls the entire LTO tape drive described later and implemented as a function provided by the control unit 160.

The third processing unit 165 functions as an ECC calculation unit in data writing and calculates ECC for the data, which has been read from the ring buffer 105 via the management unit 110 and completed in the process by the second processing unit 150. The calculated ECC is added to a segment of the ring buffer 105 where the corresponding data is stored via the management unit 110. In data reading, the third processing unit 165 corrects an error using the ECC added to the data transferred from the segment of the ring buffer 105 via the management unit 110. The data after the error correction is stored into a corresponding segment of the ring buffer 105 via the management unit 110, again.

The fourth processing unit 170 functions as a modulation unit in data writing and modulates a data set, which has been read from the ring buffer 105 via the management unit 110 and completed in the process by the third processing unit 165, to a bit stream written into the storage medium 140. In data reading, the fourth processing unit 170 reads data from the storage medium 140 and stores it in the ring buffer 105.

The storage medium 140 is a tape medium of LTO standard in this embodiment and data transmitted from the fourth processing unit 170 is recorded in units referred to as "data sets." The data set is composed of two areas, namely a data area and DSIT, and user data transmitted from the host device is stored in the data area. The ring buffer 105 is composed of a plurality of segments in which the user data in transactions is stored in an input order. Since the ring buffer 105 is used as a work area until the user data is processed to the data sets, each segment has a size of about two megabytes, which is the same as that of the data set.

The VRBSR 175 manages the processing status of the respective stages of the series of processes for each segment of the ring buffer 105. More specifically, the VRBSR 175 includes a plurality of first tables (181, 182, 183, and 184) corresponding to the plurality of processing units (145, 150, 165, and 170), respectively. Each of the first tables stores beginning information indicating a beginning segment among a plurality of segments at continuous addresses completed in the process by a corresponding processing unit, end information indicating an end segment among them, and existence information indicating the presence or absence of a segment completed in the process by a corresponding processing unit.

FIG. 4A shows an example of the plurality of first tables indicating the processing status of the series of processes shown in FIG. 2A. In FIG. 4, the first table 181, the first table 182, the first table 183, and the first table 184 correspond to the first processing unit 145, the second processing unit 150, the third processing unit 165, and the first processing unit 170, respectively. Assuming that N is 3 in FIG. 2A, the process by the first processing unit 145 corresponding to the host transfer (1) is completed from segment 3 to segment 8. Therefore, the first table 181 stores identification information of the segment 3 as the beginning information, identification information of the segment 8 as the end information, and existence information of value 1. As the identification information, it is possible to use a pointer indicating an index or address of the segment. The existence information is set to 1 if there is at least one segment completed in the process by the corresponding processing unit, or otherwise it is set to 0.

Furthermore, the process of the second processing unit 150 corresponding to the DSIT addition (2) is completed from the segment 3 to segment 6. Therefore, the first table 182 stores the identification information of the segment 3 as the beginning information, the identification information of the segment 6 as the end information, and the existence information of value 1. The values are set similarly regarding the first table 183 and the first table 184. For easier comparison, FIG. 4B shows an equal number of registers to the number of segments according to the conventional method of managing the processing status of the series of processes. It is assumed here that ten segments exist as segment 0 to segment 9 for easy understanding.

The VRBSR 175 also includes a second table 185 which stores beginning information indicating a beginning segment, end information indicating an end segment, and existence information indicating the presence or absence of a segment not completed in any of the processes by the plurality of processing units in a plurality of segments at continuous addresses not completed in any of the processes by the plurality of processing units (145, 150, 165, and 170). FIG. 4C shows an example of the second table in the processing status of the series of processes shown in FIG. 4B. The series of processes are not started yet for the segments 9 to 2 in FIG. 4B, and therefore the beginning information on the second table is the segment 9, the end information is the segment 2, and the existence information is set to 1. Note that the existence information is set to 1 if there is even one segment for which the series of processes have not been started yet, or otherwise it is set to 0.

The VRBSR 175 includes an access control unit 190. The access control unit 190 detects an update which causes a segment not processed yet by a corresponding processing unit (145, 150, 165, or 170) to exist between the beginning segment indicated by the beginning information on an arbitrary first table (181, 182, 183, or 184) and the end segment indicated by the end information on the first table and then generates an error signal. The access control unit 190 also detects an update where the beginning information and the end information do not change before and after the update of an arbitrary first table (181, 182, 183, or 184) and then generates an error signal. The details of the error signal generation method will be described later with reference to FIG. 8 to FIG. 11.

The VRBSR 175 further includes a segment status generation unit 192. The segment status generation unit 192 generates the processing status of the series of processes of a segment specified with reference to the plurality of first tables (181, 182, 183, and 184) in response to an inquiry for the processing status from the management unit 110 which specified the object segment. The generated processing status is returned to the management unit 110.

By way of example, the processing status returned to the management unit 110 is in the form of a 3-bit signal and the respective bits indicate whether the processes in the object stage and the stages before and after the object stage have been completed, respectively. The reason why the processing status on the stage immediately after the object stage is included is that the processing direction of the series of processes is reversed between data writing and data reading. For example, a stage immediately after a certain stage in data writing corresponds to a stage immediately before the certain stage in data reading. The details of the processing status generation method will be described later with reference to FIG. 7.

The VRBSR 175 further includes a pointer view register 194 and a segment view register 196. The registers are accessed by the control unit 160 described later in order to control the series of processes entirely. The pointer view register 194 provides a view showing the processing status of each processing unit and it is composed of five registers which retain the same contents as those of the plurality of first tables (181, 182, 183, and 184) and the second table 185.

FIG. 5 shows, in the lower column of the table, an example of the pointer view register 194 where the number of segments is 1024. The registers VRBSRE, VRBSRM, VRBSRC, VRBSRI, and VRBSRZ correspond to the first table 181, the first table 182, the first table 183, the first table 184, and the second table 185, respectively. The respective registers corresponding to the first tables each retain the end information at 10 bits from bit 0 to bit 9, the beginning information at 10 bits from bit 16 to bit 25, and the existence information at one bit of bit 31. Additionally, the register corresponding to the second table 185 retains the number of segments having an initial status, in other words, the number of segments not completed in any of the processes by the plurality of processing units (145, 150, 165, and 170) at 11 bits from bit 0 to bit 10 and retains existence information at one bit of bit 31. In this manner, the register corresponding to the second table 185 need not be associated one-to-one with the second table 185, and this facilitates the implementation.

The segment view register 196 provides a view showing the processing status of the series of processes for each segment and it is composed of a plurality of registers, though the number of registers is to such an extent that it has little influence on the circuit size. A collection of a plurality of segments whose processing status is provided by the segment view register 196 at a time is referred to as "one window" here. The control unit 160 accesses a register showing the processing status of a target segment while switching the window appropriately. The window is specified by the register: when the control unit 160 sets a window that it desires to access in the register, the set register value becomes a part of the address of the segment specified for the segment status generation unit 192.

FIG. 5 shows, in the upper column of the table, an example of the segment view register 196 where the number of segments is 1024. The segment view register 196 is composed of eight registers each having two bytes and one register is allocated to two segments. Therefore, in this example, the processing status of 16 segments can be checked on one window. In addition, the register value set by the control unit 160 to specify the window corresponds to high-order six bits of the address of the segment specified for the segment status generation unit 192. For each register, one byte of bit 0 to bit 7 is allocated to one segment and one byte of bit 8 to bit 15 is allocated to the other segment. Further, process complete statuses of the processes by the plurality of processing units (145, 150, 165, and 170) are retained at four bits of bit 0 to bit 4 of each byte, respectively. The plurality of registers included in one window need not be updated at a time necessarily, but only one register can be updated. The register can be accessed in either way of accessing two segments allocated to the register or accessing one of the segments.

The control unit 160 reads or changes the processing status of the series of processes using a view appropriate for a purpose. For example, when clearing the processing status of a plurality of segments regarding one process, the control unit 160 accesses the pointer view register 194. When clearing the processing status of the series of processes regarding one segment, the control unit 160 accesses the segment view register 196. In this manner, two types of views are prepared for the control unit 160 for the processing status of the series of processes in this embodiment.

The management unit 110 manages a data transfer between the ring buffer 105 and the plurality of processing units (145, 165, and 170) so that the series of processes are performed in a given order on the basis of the processing status of the series of processes retained in the plurality of first tables. The data transfer is performed by sending an inquiry concerning the processing status of the series of processes of the segment to be processed next for the respective plurality of processing units to the segment status generation unit 192 and determining whether the processing status satisfies the start condition on the process by the processing unit. More specifically, the management unit 110 transfers unit data of the segment to be processed next to the processing unit for which the start condition is determined under the condition that the process by the processing unit for which the start condition is determined is not completed and the process by the preceding processing unit is completed as the processing status for the segment to be processed next.

Therefore, the management unit 110 includes counters (a first counter 112, a second counter 120, a third counter 122, and a fourth counter 130) indicating the segments to be processed next for the respective plurality of processing units which perform the series of processes in a given order, start determination units (a first start determination unit 114, a third start determination unit 124, and a fourth start determination unit 132) which determine whether the processing status of the series of processes for the segment indicated by the counters satisfy the start condition on the processes by the processing units, transfer units (a first data transfer unit 116, a second data transfer unit 121, a third data transfer unit 126, and a fourth data transfer unit 134) which transfer data between the ring buffer 105 and the processing units, and updating units (a first updating unit 118, a third updating unit 128, and a fourth updating unit 136) which update the corresponding first tables (181, 183, and 184) after the data transfer.

The second processing unit 150 is included in the control unit 160 which controls the entire LTO tape drive and is implemented as a function provided by the control unit 160, and therefore the data transfer between the ring buffer 105 and the second processing unit 150 is basically managed by the control unit 160. Accordingly, the start determination unit (a second start determination unit 152) and an updating unit (a second updating unit 156) for the second processing unit 150 are included in the control unit 160 and only a counter (second counter 120) and a second data transfer unit 121 are included in the management unit 110.

The data transfer management method of the management unit 110 in data writing will be explained in concrete terms with an example of a data transfer between the ring buffer 105 and the third processing unit 165. First, a value of the third counter 122 is sent to the VRBSR 175 and is received by the segment status generation unit 192. It is assumed here that the plurality of first tables are placed in the state shown in FIG. 4A. Although the details will be described later, the segment status generation unit 192 generates the processing status of a series of processes of a segment (assumed here to be segment 6) indicated by the third counter 122 with reference to the plurality of first tables (181, 182, 183, and 184).

For the segment 6, the processes by the first processing unit 145 and the second processing unit 150 have been completed, but the processes by the third processing unit 165 and the fourth processing unit 170 are not performed yet (See reference numeral 405 in FIG. 4A and FIG. 4B). Therefore, the segment status generation unit 192 generates a 3-bit signal "100" finally as a processing status of the series of processes and returns it to the management unit 110. The bits of the 3-bit signal correspond to the second processing unit 150, the third processing unit 165, and the fourth processing unit 170 starting from the leftmost bit in this order. The third start determination unit 124 determines whether the processing status "100" for the received segment 6 satisfies the start condition on the process by the third processing unit 165, in other words, whether it indicates that the process by the third processing unit 165 is not completed and the process by the second processing unit 150 is completed. Unless the condition is satisfied, the third start determination unit 124 continues to await a signal satisfying the condition.

The received 3-bit signal satisfies the condition since only the leftmost bit corresponding to the second processing unit 150 is set to value 1, and therefore the third start determination unit 124 informs the third data transfer unit 126 of the start of the data transfer. The third data transfer unit 126 reads the unit data of the segment 6 from the ring buffer 105 and transfers it to the third processing unit 165. Then, the third updating unit 128 awaits the data transfer and updates the first table 183. In this embodiment, the third updating unit 128 makes a request to the VRBSR 175 for updating the first table 183 of the segment 6 and the access control unit 190 practically performs the update. In addition, after the data transfer, the third counter is incremented so that the value indicates the next segment.

Since the series of processes in data writing have been explained as an example in the above, the rightmost bit corresponding to the fourth processing unit is ignored in the 3-bit signal indicating the processing status. In the series of processes in data reading, however, the stage immediately before the third processing unit 165 corresponds to the fourth processing unit 170 and therefore the leftmost bit corresponding to the second processing unit is ignored in the 3-bit signal indicating the processing status of the series of processes.

The method of the data transfer between the ring buffer 105 and the second processing unit 150 managed by the control unit 160 is basically the same as the method by the management unit 110. In the method by the control unit 160, however, the processing status of the series of processes for the segment indicated by the second counter 120 generated by the segment status generation unit 192 is written into the segment view register 196. Therefore, the control unit 160 needs to read out a register value of the segment view register 196 corresponding to the segment indicated by the second counter 120 and to send it to the second start determination unit 152.

In addition, the update of the first table 182 by the second updating unit 156 is performed via the pointer view register 194. More specifically, the second updating unit 156 updates the pointer view register 194 corresponding to the first table 182 so that the access control unit 190 performs the updating. The updated content of the pointer view register 194 is reflected on the first table 182 immediately.

The control unit 160 controls the entire storage device including the processing system 100. The control unit 160 includes the second processing unit 150, the second start determination unit 152, and the second updating unit 156, which have been as described above. The control unit 160 further includes an initialization unit 158. The initialization unit 158 changes the beginning information of each of the plurality of first tables (181, 182, 183, and 184) in such a way that the beginning information indicates a segment next to the beginning segment, for example, when data is written into a segment located a few segments back from the last one where the ring buffer 105 is full, before data is written into all segments of the ring buffer 105. This prevents the data transfer from being interrupted, so that the ring buffer can be effectively used as much as possible. The initialization unit 158 can be notified of information on the full state by using, for example, a status register.

The processing of the initialization unit 158 in data writing will be described with an example of the processing status of the series of processes shown in FIG. 4. It is assumed here that, as shown in FIGS. 4A and 4B, data is written sequentially from the segment 3 and is last written into the segment 2. In this instance, the beginning information is changed from the segment 3 to the segment 4 before data is written into all segments from the segment 3 to the segment 2 of the ring buffer 105. As a result, the processing status of the series of processes for the segment 3 indicated by shaded areas in FIG. 4B are initialized to 0, by which data can be overwritten for the segment 3. Alternatively, it is also possible to change the beginning information so that it indicates a segment, which is not next to the beginning segment, but a few such as two or three segments ahead of the beginning segment.

The control unit 160 further includes an adjusting unit 159 which adjusts a speed of data writing or data reading to or from the storage medium 140 with reference to the second table 185. Generally, the storage device has a function of checking the data transfer speed of the host device and of the storage device and adjusting the data transfer speed of the storage device, namely the storage medium 140. As described above, the second table 185 stores the beginning information indicating the beginning segment and the end information indicating the end segment in a plurality of segments at continuous addresses where the series of processes are not started yet. Therefore, the control unit 160 according to the present invention adjusts the data transfer speed of the storage medium 140 more finely on the basis of the number of remaining segments for which the series of processes are not started yet and their locations on the ring buffer 105, with reference to the second table 185. Since other functions of the control unit 160 are well known to those skilled in the art and do not directly relate to the present invention, their description will be omitted here.

Figure 6A:
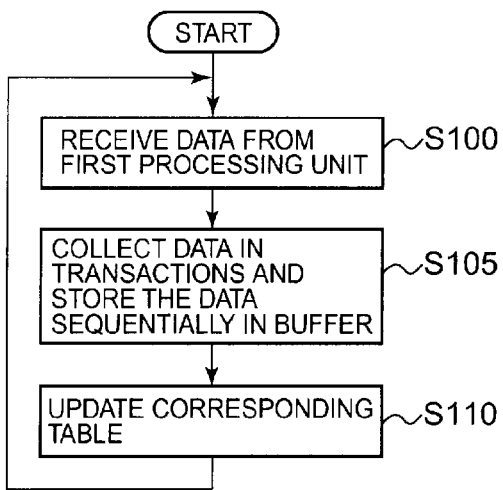
FIG. 6A is a flowchart showing an example of a processing flow in data writing of a management unit 110 for a first processing unit 145 and FIG. 6B is a flowchart showing an example of a processing flow in data writing of the management unit 110 for a third processing unit 165 and a fourth processing unit 170.

Subsequently, the operation in data writing of the processing system 100 according to this embodiment will be described with reference to the flowcharts shown in FIG. 6 to FIG. 8. FIG. 6A shows a processing flow in data writing of the management unit 110 for the first processing unit 145. The process starts at step 100, where the management unit 110 receives user data, which has been transmitted by the host device, from the first processing unit 145. The management unit 110 collects the received user data in transactions and stores the user data in the segments of the ring buffer 105 (step 105). The management unit 110 then updates the first table 181 corresponding to the first processing unit 145 using identification information of the segment where the data is stored (step 110). As described above, the management unit 110 makes a request to the VRBST for the update in this embodiment and practically the access control unit 190 performs the update.

Figure 6B:
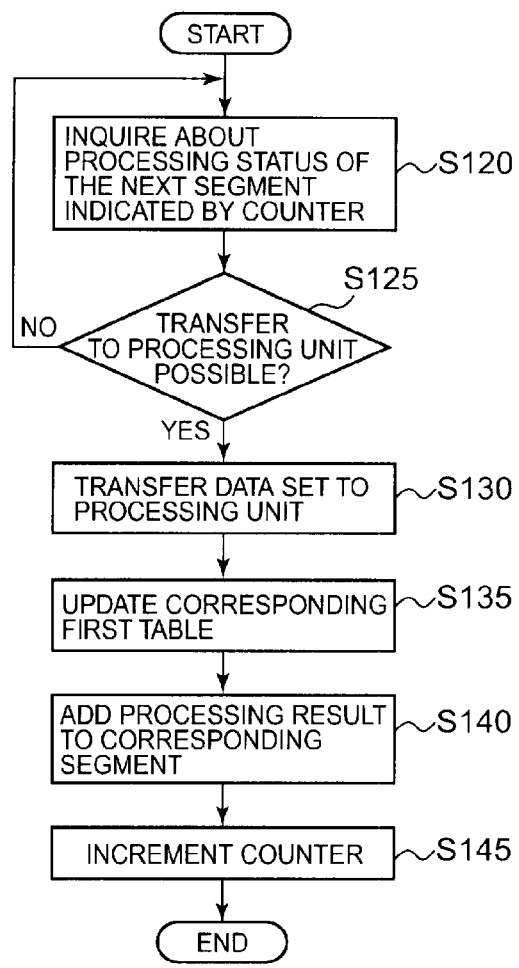

FIG. 6B shows a processing flow in data writing of the management unit 110 for the third processing unit 165 and the fourth processing unit 170 or a processing flow in data writing of the control unit 160 for the second processing unit 150. This specification describes the flowchart shown in FIG. 6B as the process of the management unit 110 for the third processing unit 165. The process starts at step 120, where the management unit 110 sends the value of the third counter 122 to the VRBSR 175 to inquire about the processing status of the series of processes for the next segment. Upon receiving the processing status for the next segment from the VRBSR 175, the management unit 110 determines whether the process by the third processing unit 165 can be started for the next segment (step 125). If NO in step 125, the process returns to step 120 to keep on awaiting the processing status satisfying the condition.

On the other hand, if YES in step 125, the management unit 110 reads unit data from the next segment of the ring buffer 105 indicated by the third counter 122 and transfers the unit data to the third processing unit 165 (step 130). After the data transfer, the management unit 110 updates the first table 183 using the value of the third counter 122 (step 135). Then, after the process terminates in the third processing unit 165 and the result of the process is transmitted, the management unit 110 stores and adds the received result of the process in and to the segment indicated by the third counter 122 (step 140). Finally, the management unit 110 increments the third counter 122 so that it indicates the next segment (step 145).

Note that step 140 does not exist in the process of the management unit 110 for the fourth processing unit 170. This is because the process for the fourth processing unit 170 is the last one in the series of processes in data writing. In the process of the control unit 160 for the second processing unit 150, the processing status of the series of processes for the next segment is read from the corresponding segment view register 196 as described above.

Figure 7:
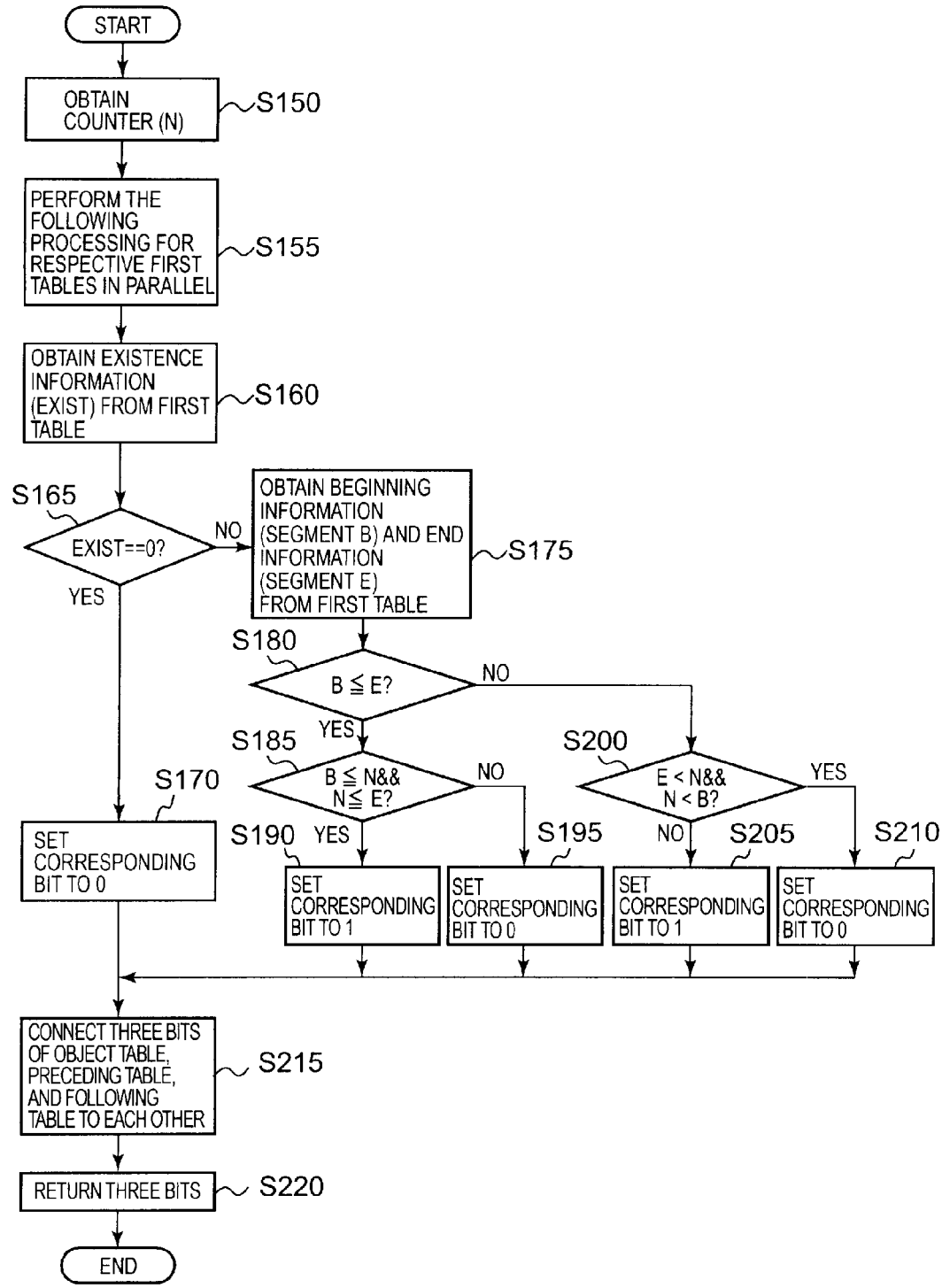
FIG. 7 is a flowchart showing an example of a processing flow in data writing of a segment status generation unit 192.

Referring to FIG. 7, there is shown a processing flow in data writing of the segment status generation unit 192 of the VRBSR 175. The process starts at step 150, where the segment status generation unit 192 receives an inquiry about the processing status of the series of processes with the counter value N sent from the management unit 110 and thereby obtains information on an object segment (segment (N)) and an object stage from the received information. Subsequently, the segment status generation unit 192 performs the following process of step 160 to step 210 for the respective plurality of first tables in parallel in order to set one bit indicating the processing status in each stage. It is assumed that value 0 of one bit indicates that the process has not been completed yet and value 1 indicates that the process has already been completed.

First, value EXIST of the existence information is obtained from the first table (step 160). Then, it is determined whether the value EXIST is 0 (step 165). If the value EXIST is 0 (step 165: YES), the corresponding bit is set to 0 (step 170). It is because the existence information "0" means that there is no segment where the process of the currently intended stage has been completed.

On the other hand, if NO in step 165, the segment status generation unit 192 obtains the beginning information (segment (B)) and the end information (segment (E)) from the first table in the above (step 175). It then determines whether the object segment (segment (N)) is located between the beginning segment (segment (B)) and the end segment (segment (E)) completed in the process on the ring buffer 105 as described below.

First, the segment status generation unit 192 determines whether the value B is equal to or less than the value E (step 180). If YES in step 180, it then determines whether N is equal to or greater than B and equal to or less than E (step 185). If YES in step 185, the object segment (segment (N)) is included between the beginning segment (segment (B)) and the end segment (segment (E)), and therefore the corresponding bit is set to 1 (step 190). On the other hand, unless the value N is equal to or greater than B and equal to or less than E (step 185: NO), the object segment (segment (N)) is not included in the range of the segments completed in the process, and therefore the corresponding bit is set to 0 (step 195).

On the other hand, if the value B is greater than the value E (step 180: NO), the segment status generation unit 192 then determines whether the value N is greater than the value E and less than the value B (step 200). If NO in step 200, the object segment (segment (N)) is located between the beginning segment (segment (B)) and the end segment (segment (E)), and therefore the corresponding bit is set to 1 (step 205). On the other hand, if YES in step 200, the object segment (segment (N)) is not included in the range of segments completed in the process and therefore the corresponding bit is set to 0 (step 210).

The process proceeds to step 215 from steps 170, 190, 195, 205, or 210, where the segment status generation unit 192 sequentially connects a bit corresponding to the stage immediately preceding the object stage, which is assumed as the leftmost bit, a bit corresponding to the object stage, and a bit corresponding to the stage immediately following the object stage. Then, the segment status generation unit 192 returns the generated 3-bit signal as a processing status to the management unit 110 (step 220) and the process terminates.

The above has described the processing flow of the segment status generation unit 192 in the case where one segment is specified by the counter of the management unit 110. In the case of getting the processing status of the plurality of segments with a window specified by the control unit 160, however, the processing flow of the segment status generation unit 192 is the same as the above. In other words, in this case, the explained process is performed in parallel with reference to FIG. 7 for the plurality of segments.

Figure 8:
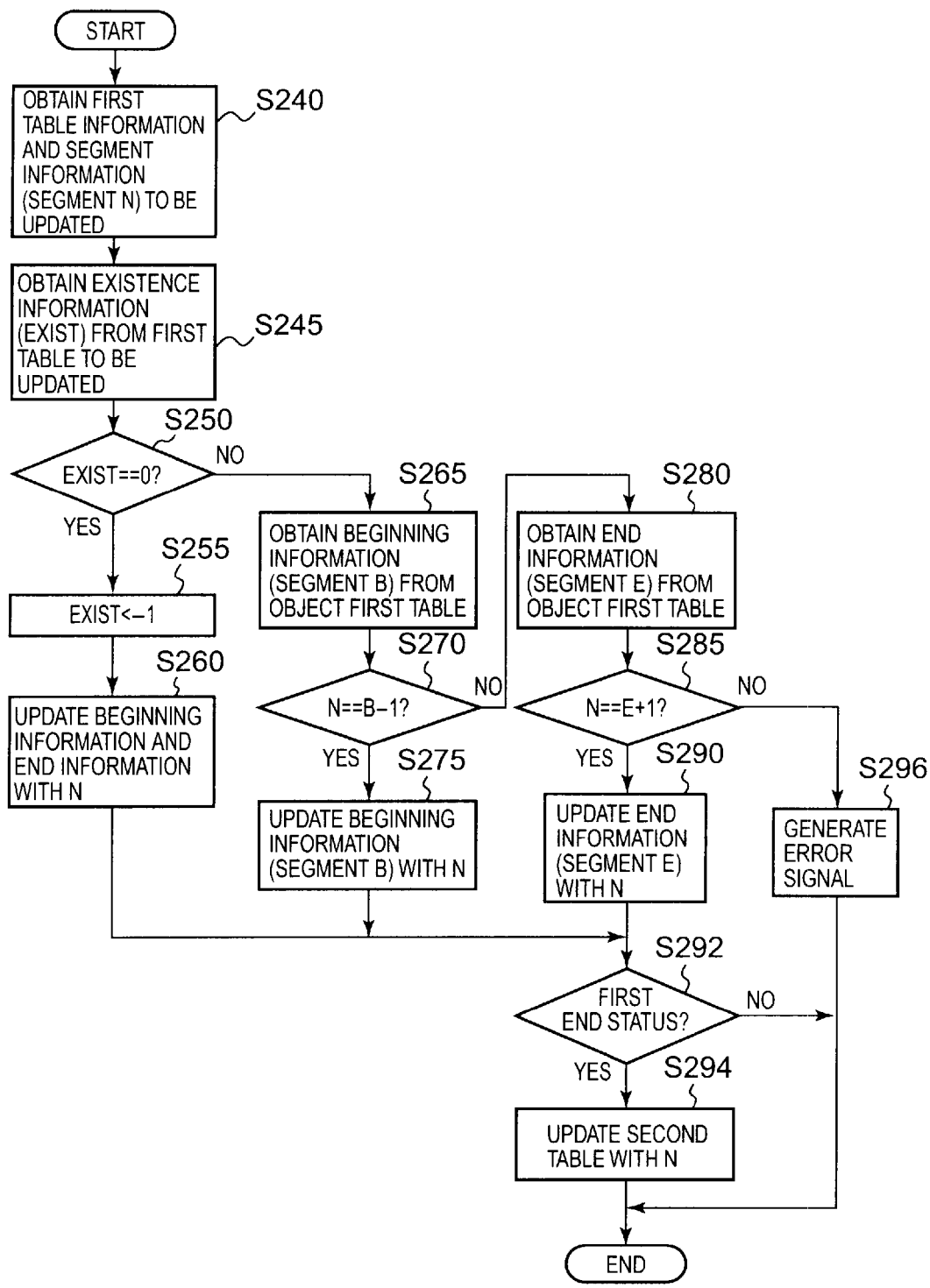
FIG. 8 is a flowchart showing an example of a processing flow in data writing of an access control unit 190 for an arbitrary updating unit of the management unit 110.

Referring to FIG. 8, there is shown a processing flow in data writing of the access control unit 190 for an arbitrary updating unit (a first updating unit 118, a third updating unit 128, and a fourth updating unit 136) of the management unit 110. The process starts at step 240, where the access control unit 190 obtains the first table information and the segment information (segment (N)) to be updated from an arbitrary updating unit of the management unit 110. The access control unit 190 obtains the existence information (value EXIST) from the first table to be updated (step 245) and determines whether there is any segment completed in the process, in other words, whether the value EXIST is equal to 0 (step 250). If YES in step 250, there is no segment completed in the process, and therefore the access control unit 190 sets the existence information to 1 (step 255) and updates the beginning information and the end information on the first table to be updated with segment (N) (step 260).

FIG. 9 shows the processing status of the segments of an arbitrary processing unit (FIG. 9A) and the first tables before and after updating corresponding to the processing unit (FIG. 9B and FIG. 9C). In FIG. 9A, a minus sign "−" indicates a segment not completed in the process, a character "B" indicates a beginning segment completed in the process, a multiplication sign "×" indicates a segment completed in the process, a character "E" indicates an end segment completed in the process, and a shaded area indicates a segment completed in the process anew.

In FIG. 9, a case where the first table is updated for a first segment completed in the process is shown as a case 1. Regarding the case 1 in FIG. 9A, the process is completed anew for the segment 2. Since there is no segment completed in the process before updating, the existence information is set to 0 in the case 1 in FIG. 9B. The process for the segment 2 is completed after updating, and therefore the beginning information and the end information of the case 1 in FIG. 9C indicate the segment 2 and the existence information is set to 1.

Returning to step 250 in FIG. 8A, on the other hand, if the value EXIST is 1, it indicates that there is a segment completed in the process and therefore it is necessary to check that the requested update of the first table does not cause the first table to be discontinuous or to be overwritten. Therefore, if the value EXIST is equal to 1 (step 250: NO), the access control unit 190 obtains the beginning information (segment (B)) from the first table to be updated (step 265). Then, the access control unit 190 determines whether the segment (N) on the ring buffer is located just before the segment (B), in other words, whether the value N is equal to value B−1 (step 270). If the value N is equal to the value B−1 (step 270: YES), the access control unit 190 updates the beginning information of the first table to be updated with the segment (N) (step 275).

In FIG. 9, if there is a segment completed in the process, a first case where the first table is updated for the segment completed in the process anew is shown as case 2. In the case 2 in FIG. 9A, the process is completed anew for the segment 1. Since the process is completed from the segment 2 to the segment 5 before the update, the beginning information, the end information, and the existence information of the case 2 in FIG. 9B are set to 2, 5, and 1, respectively. Since the process of the segment 1 is completed anew after the update, the beginning information of the case 2 in FIG. 9C is updated to 1. The case 2 is impossible as long as the segments are sequentially processed on the ring buffer. In the case 2, however, the first table is updated in such a way that the segments change in succession, and therefore this type of update is also permitted in this embodiment.

Returning to FIG. 8, if NO in step 270, the access control unit 190 obtains the end information (segment (E)) from the first table to be updated (step 280). Then, the access control unit 190 determines whether the segment (N) on the ring buffer is located immediately after the segment (B), in other words, whether the value N is equal to value E+1 (step 285). If YES in step 285, the access control unit 190 updates the end information of the first table to be updated with the segment (N) (step 290).

In FIG. 9, if there is a segment completed in the process, the second case where the first table is updated for the segment completed in the process anew is shown as case 3. In the case 3 in FIG. 9A, the process is completed anew for the segment 6. Since the process is completed from the segment 2 to the segment 5 before the update, the beginning information, the end information, and the existence information of the case 3 in FIG. 9B are set to 2, 5, and 1, respectively. Since the process of the segment 6 is completed anew after the update, the end information of the case 3 in FIG. 9C is updated to 6. The case 3 is a most likely ordinary case.

Returning to FIG. 8, the process proceeds from step 260, step 275, or step 290 to step 292, where the access control unit 190 checks other first tables to determine whether the update is the first one for the segment (N), in other words, whether the process by any other processing unit has been completed for the segment (N). If YES in step 292, the access control unit 190 update the second table 185 with the segment (N) (step 294). If NO in step 292 or after step 294, the process terminates.

On the other hand, if NO in step 285, in other words, unless the value N is equal to the value E+1, the access control unit 190 generates an error signal (step 296). It is because the requested update of the first table causes the segments completed in the process to be discontinuous or to be overwritten. Thereafter, the process terminates. The error signal is transmitted as an interrupt or a status register to the control unit 160.

In FIG. 9, if there is a segment completed in the process, the third case where the first table is updated for the segment completed in the process anew is shown as case 5. In the case 4 in FIG. 9A, the process is completed anew for the segment 0 (or segment 7). Since the process is completed from the segment 2 to the segment 5 before the update, the beginning information, the end information, and the existence information of the case 4 in FIG. 9B are set to 2, 5, and 1, respectively. If the beginning information is updated with segment 0 in this condition, the segment 1 is shown as a segment completed in the process, though the process is not actually completed for the segment 1. Similarly, if the end information is updated with segment 7, the segment 6 is shown as a segment completed in the process, though the process is not actually completed for the segment 6. Therefore, the update of the first table is not permitted in the case 4.

As shown in FIG. 9A, the process is completed anew for the segment 2 (or one of the segments 3, 4, and 5) in the case 5. Since the process is completed from the segment 2 to the segment 5 before the update, the beginning information, the end information, and the existence information of the case 5 in FIG. 9B are set to 2, 5, and 1, respectively. If the update is permitted here, apparently the first table does not change and the segments completed in the process remain continuous, though it permits data overwriting on the segment 2 (or one of the segments 3, 4, and 5). Therefore, in the case 5, the update of the first table is not permitted. The overwriting on the segment completed in the process in the first table, however, leads to data overwriting on the segment of the ring buffer 105 only in hardware that is required to conform to the sequence necessarily. Therefore, alternatively the update of the first table by the control unit 160 can be permitted in the case 5.

Figure 10A:
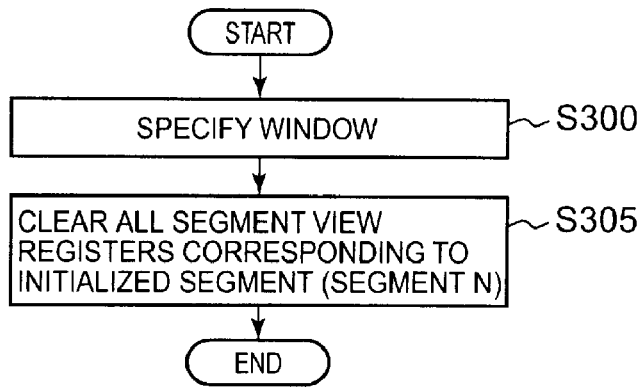
FIG. 10A is a flowchart showing an example of the processing flow of a control unit 160 for clearing a process complete status of a specific segment using a segment view register 196 and FIG. 10B is a flowchart showing an example of the processing flow of an access control unit 190 for clearing the process complete status of the specific segment using the segment view register 196.

Referring to FIG. 10A, there is shown the processing flow of the control unit 160 for clearing a process complete status of a specific segment by using the segment view register 196. The process starts at step 300, where the control unit 160 specifies a window including a segment for which the processing status of the series of processes should be cleared. Then, the control unit 160 accesses the segment view register 196 corresponding to the target segment and sets all bits to 0 (step 305). Thereafter, the process terminates.

Figure 10B:
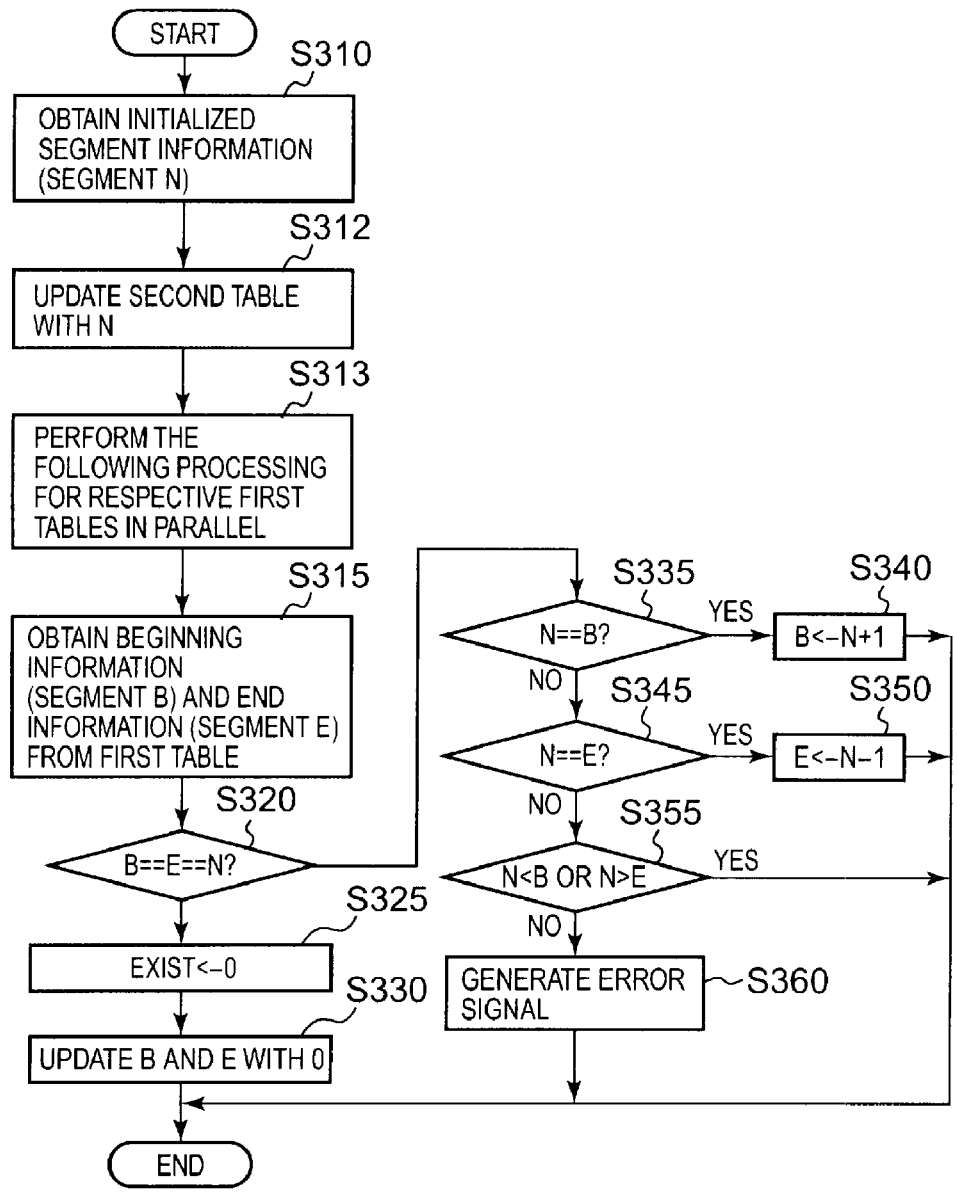

Referring to FIG. 10B, there is shown the processing flow of the access control unit 190 for clearing the first table by using the segment view register 196. The flowchart shown in FIG. 10B continues to the flowchart in FIG. 10A. The process starts at step 310 and the access control unit 190, first, obtains segment information (segment ()) corresponding to the cleared segment view register 196. The segment (N) becomes a segment for which the series of processes are not started anew, and therefore the access control unit 190 updates the second table 185 with the segment (N) (step 312). Subsequently, the access control unit 190 performs the following process from step 315 to step 360 for each of the plurality of first tables (181, 182, 183, and 184).

In step 315, the access control unit 190 obtains the beginning information (segment (B)) and the end information (segment (E)) from the first table. The access control unit 190 then determines whether all of the segment (N), segment (B), and segment (E) are identical segments (step 320) to check whether the segment whose status is to be cleared is the only one segment having the process complete status in the first table concerned. If YES in step 320, the access control unit 190 sets the existence information (EXIST) to 0 (step 325). The access control unit 190 sets the beginning information and the end information of the first table to 0 to clear them (step 330). Thereafter, the process terminates.

FIG. 11 shows the processing status of the segments of an arbitrary processing unit (FIG. 11A) and the first tables before and after the update corresponding to the processing unit (FIGS. 11B and 11C). In FIG. 11A, a minus sign "–" indicates a segment not completed in the process, a character "B" indicates a beginning segment completed in the process, a multiplication sign "×" indicates a segment completed in the process, a character "E" indicates an end segment completed in the process, and a shaded area indicates a segment whose process complete status should be cleared.

In FIG. 11, a case where the segment whose status is to be cleared is the only one segment having a process complete status is shown as case 1. Focusing on the case 1 in FIG. 11A, the segment 2 corresponds to the segment whose status is to be cleared. Since the process is completed only for the segment 2 before the update, both of the beginning information and the end information of the case 1 in FIG. 11B indicate the segment 2. After the update, the process complete status of the segment 2 is cleared, and therefore the beginning information and the end information of the case 1 are set to 0 and the existence information is also set to 0 in FIG. 11C.

Returning to FIG. 10B, if NO in step 320, the access control unit 190 determines whether the segment (N) is equal to the segment (B) (step 335). If N is equal to B (step 335: YES), the access control unit 190 sets the beginning information of the first table to segment (B+1) (step 340). Thereafter, the process terminates. Unless N is equal to B (step 335: NO), the access control unit 190 determines whether the segment (N) is equal to the segment (E) (step 345). If N is equal to E (step 345: YES), the access control unit 190 sets the end information of the first table to segment (E−1) (step 350). Thereafter, the process terminates.

In FIG. 11, a case where the segment whose status is to be cleared is the beginning segment among the continuous segments having the process complete status is shown as case 2. Focusing on the case 2 in FIG. 11A, the segment 2 corresponds to the segment whose status is to be cleared. Since the process is completed from the segment 2 to the segment 5 before the update, the beginning information, the end information, and the existence information of the case 2 in FIG. 11B are set to 2, 5, and 1, respectively. After the update, the process complete status of the segment 2 is cleared and therefore the beginning information of the case 2 in FIG. 11C is updated to 3.

If the segment whose status is to be cleared is the end segment among the continuous segments having the process complete status in FIG. 11, the case is shown as case 3. Focusing on the case 3 in FIG. 11A, the segment 5 corresponds to the segment whose status is to be cleared. Since the process is completed from the segment 2 to the segment 5 before the update, the beginning information and the end information of the case 3 are set to 2 and 5, respectively, and the existence information is set to 1 in FIG. 11B. Since the end status of the segment 5 is cleared after the update, the end information of the case 3 in FIG. 11C is updated to 4.

Returning to FIG. 10B, if NO in step 345, the access control unit 190 determines whether N is less than B or greater than E, in other words, whether the segment (N) is outside the range of the segment (B) to the segment (E) (step 355). If it is outside the range (step 355: YES), the access control unit 190 does not performs any process for the table concerned since the segment (N) originally does not have the process complete status. On the other hand, if NO in step 355, the access control unit 190 generates an error signal (step 360). It is because the update of the first table requested via the segment view register 196 causes a discontinuous arrangement of the segments completed in the process. Thereafter, the process terminates. The error signal is transmitted as an interrupt or a status register to the control unit 160.

In FIG. 11, if the segment whose status is to be cleared does not have a process complete status, the case is shown as case 4. Focusing on the case 4 in FIG. 11A, segment 0 (or one of the segments 1, 6, and 7) corresponds to a segment whose status is to be cleared. Since the process is completed from the segment 2 to the segment 5 before the update, the beginning information and the end information of the case 4 in FIG. 11B are set to 2 and 5, respectively, and the existence information is set to 1. Since the first table is not updated in the case 4, the case 3 in FIG. 11C is the same as the case 3 in FIG. 11B.

Furthermore, in FIG. 11, if the segment whose status is to be cleared corresponds to a segment located in the middle of the continuous segments having the process complete status, the case is shown as case 5. Focusing on the case 5 in FIG. 11A, the segment 4 corresponds to a segment whose status is to be cleared. Since the process is completed from the segment 2 to the segment 5 before the update, the beginning information and the end information of the case 5 in FIG. 11B are set to 2 and 5, respectively, and the existence information is set to 1. If the clearance of the process complete status of the segment 4 is permitted here, it causes a discontinuous arrangement of the segments having the process complete status, and therefore the update of the first table is not permitted in the case 5.

Figure 12:
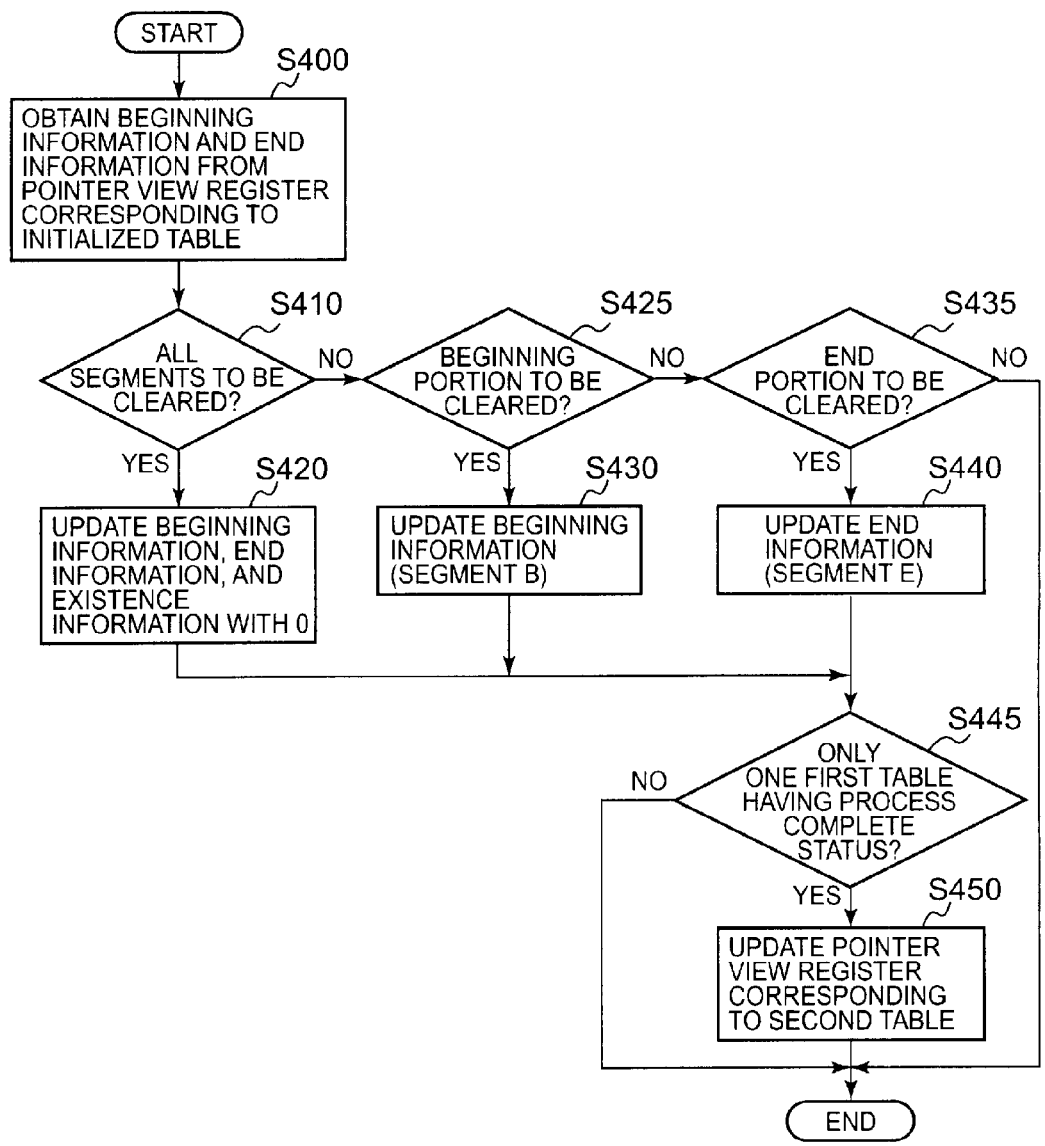
FIG. 12 is a flowchart showing an example of the processing flow of the control unit 160 for clearing a process complete status of a specific first table using the pointer view register 194.

Referring to FIG. 12, there is shown the processing flow of the control unit 160 for clearing the process complete status of a specific first table using the pointer view register 194. The process starts at step 400, where the control unit 160 obtains the beginning information and the end information from the pointer view register 194 which retains the same content as that of the first table required to be initialized (step 400). Then, the control unit 160 determines whether one or more segments whose process complete status is to be cleared corresponds to all segments currently having the process complete status (step 410). If YES in step 410, the control unit 160 sets all of the beginning information, the end information, and the existence information to 0 (step 420).

On the other hand, if some of the segments having the process complete status are to be cleared (step 410: NO), first, the control unit 160 determines whether one or more segments to be cleared correspond to the beginning of the segments currently having the process complete status (step 425). If YES in step 425, the control unit 160 updates the beginning information to clear the status of the beginning segments having the process complete status (step 430).

On the other hand, if the segments to be cleared are other than the beginning of the segments currently having the process complete status (step 425: NO), the control unit 160 further determines whether one or more segments to be cleared correspond to the end of the segments currently having the process complete status (step 435). If YES in step 435, the control unit 160 updates the end information to clear the status of the end segments having the process complete status (step 440).

The process proceeds from step 420, 430, or 440 to step 445, where the control unit 160 determines whether the updated first table is the only one first table having the process complete status regarding the segments whose process complete status is cleared. If YES in step 445, the control unit 160 updates the pointer view register 194 corresponding to the second table (step 450). If NO in step 435 or 445 or after step 450, the process terminates. The value of the updated pointer view register 194 is immediately reflected on the corresponding first and second tables.

Figure 13:
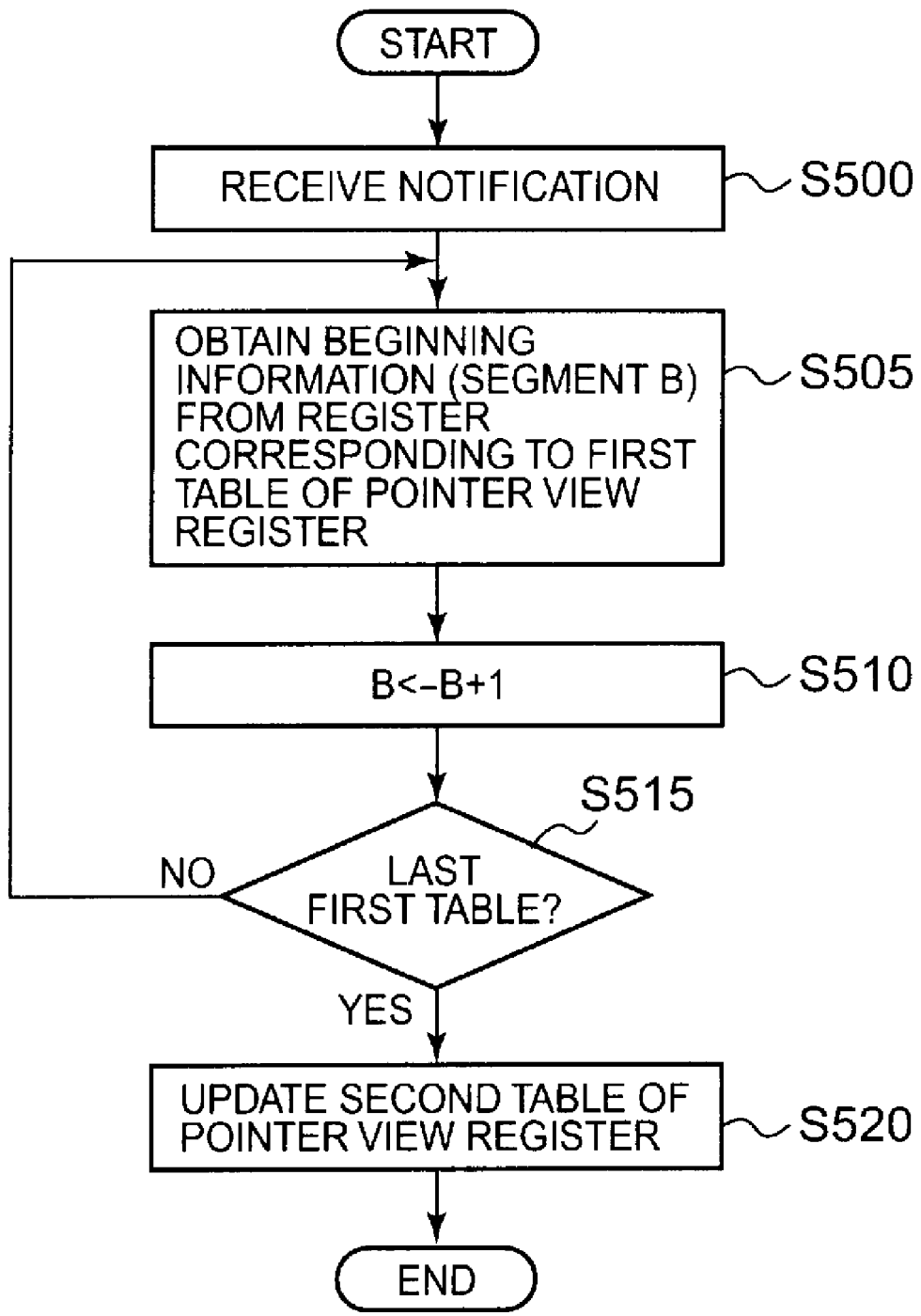
FIG. 13 is a flowchart showing an example of the processing flow of the initialization unit 158.

Referring to FIG. 13, there is shown the processing flow of the initialization unit 158. As described above, the initialization unit 158 clears the status of the beginning segment having the process complete status before data is written into all segments of the ring buffer 105 to prevent the ring buffer 105 from being full. The process starts at step 500, and the initialization unit 158 receives notification that the ring buffer 105 will be full soon. By way of example, the notification is made by detecting the time point when a segment two segments ahead of the segment indicated by the end information corresponds to the segment indicated by the beginning information by means of hardware and then issuing a signal. The initialization unit 158 reads a value (segment (B)) of the register retaining the beginning information from the pointer view register 194 corresponding to the first table in response to the notification (step 505).

Then, the initialization unit 158 updates the read register value with segment (B+1) and changes the beginning information so as to indicate a segment immediately following the beginning segment (step 510). Then, the initialization unit 158 checks whether the first table whose beginning information is changed is the last one of the first tables, in other words, whether there is any other first table whose beginning information is not changed yet (step 515). If NO in step 515, the process returns to step 505. On the other hand, the process is completed for all the pointer view registers 194 corresponding to the first tables (step 515: YES), the initialization unit 158 updates the pointer view register 194 corresponding to the second table 185 (step 520). Then, the process terminates.

Alternatively, the beginning information can be changed so as to indicate a segment several segments ahead of the beginning segment.

Subsequently, a storage device including a processing system according to a second embodiment will be described below. The processing system according to the second embodiment is the same as the processing system according to the first embodiment except that new functions are added. The additional functions are provided to prevent discontinuous process complete statuses on the first table, which may occur in the case of overwriting in the middle of data. Therefore, first, description will be made on the discontinuous process complete statuses on the first table which may occur in overwriting with reference to FIG. 14 and FIG. 15.

Referring to FIG. 14, there is shown an example of a case where the process complete statuses are discontinuous in overwriting. As described above, the initialization unit 158 according to the present invention changes the beginning information of each of the plurality of first tables so as to indicate a segment immediately following the beginning segment or a segment several segments ahead of the beginning segment before the ring buffer 105 becomes full and clears the statuses of some segments in the beginning portion. FIG. 14A shows the state where the ring buffer 105 is almost full since data is transferred up to segment N−2 in the last write or read processing and thereby the statuses of the segment N−1 and the segment N are cleared.

It is assumed here that the write or read processing terminates due to a data transfer to the segment N−2 and then overwriting is performed. When overwriting is performed, the host device transmits a Locate command for overwriting to the storage device. The control unit 160 of the storage device which has received the Locate command finds an overwritten location on the ring buffer 105 and performs overwriting. If, for example, the segment N is determined as the overwritten location, the statuses of the segment N+1 and after are initialized to start write processing anew (see FIG. 14B). Depending on the start position of the overwriting, however, it is necessary to change the status of the segment N temporarily as shown in FIG. 14C, though the reason will be described later with reference to FIG. 15. As apparent from FIG. 14C, however, the status change of the segment N causes discontinuous process complete statuses though it is a temporary event.

The storage device adds an ECC to data transmitted from the host device before storing it in the ring buffer 105 to protect the data in many cases. FIG. 15A shows data protected by a two-dimensional ECC. The data is arranged in an array with m rows×n columns with a row error correcting code (hereinafter, referred to as C1ECC) added in the row direction and a column error correcting code (hereinafter, referred to as C2ECC) added in the column direction. The overwriting is performed on the ring buffer 105 as described above, however, and therefore the start position of the overwriting matters because of a relation with the C1ECC added before the data is stored in the ring buffer 105. The calculation of the C2ECC does not matter since it is performed by the above-described third processing unit 165 after the overwriting.

If the start position of overwriting is the beginning of unit data (hereinafter, referred to as C1ECC codeword) 420 to which the C1ECC is added (See reference numeral 425 in FIG. 15A), there is no problem since the C1ECC can be calculated using only the overwritten data. If the start position of overwriting is located in the middle of the C1ECC codeword 430 (See reference numeral 435 in FIG. 15A), however, the C1ECC should be calculated using existing data up to the start position of overwriting and subsequent overwritten data under ordinary circumstances, but the calculation and addition of the C1ECC are performed before the overwriting as described above. The result is an occurrence of a mismatch in the C1ECC.

Therefore, to prevent the mismatch in the C1ECC described above, the following process is performed if the start position of overwriting is located in the middle of the C1ECC codeword. Specifically, although overwriting of data is originally a type of write processing, the C1ECC codeword 430 including the start position of overwriting is once returned in the reading direction 445 and read out to the SRAM upstream from a C1ECC encoder 440. Thereafter, as shown in FIG. 15C, overwriting is performed on the C1ECC codeword 430 by using data transmitted from the first processing unit (see FIG. 3) to a management unit 455 on the SRAM. A C1ECC codeword 460 after the overwriting is input to the C1ECC encoder 440. In this manner, the mismatch in C1ECC is prevented by recalculating the C1ECC regarding the C1ECC codeword having the start position of overwriting in the middle.

To return and read the C1ECC codeword 430 stored in the ring buffer 400 to the SRAM upstream from the C1ECC encoder 440 once, it is necessary to set the process complete status of a segment including the C1ECC codeword 430 for the fourth processing unit 170, the third processing unit 165, and the second processing unit 150 (see FIG. 3 for each). It is because the hardware operation is controlled by the status indicating the processing status of the series of processes. Therefore, if the start position of overwriting is located in the middle of the C1ECC codeword included in the segment N in the situation described with reference to FIG. 14, it is necessary to change the status of the segment N temporarily from "0000" to "0111." This change, however, causes the discontinuous process complete statuses as described above. Therefore, the processing system according to the second embodiment of the present invention has additionally a new function of removing the discontinuity of the process complete statuses.

Figure 16:
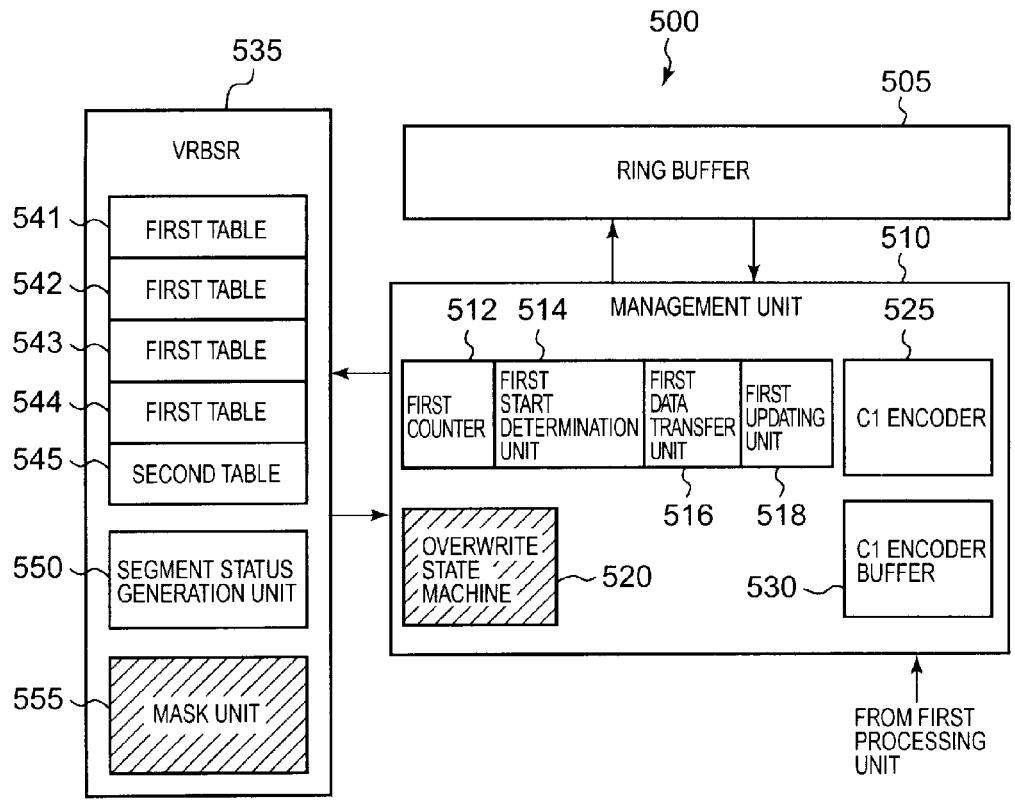
FIG. 16 is a diagram showing an example of the configuration of a processing system 100 according to a second embodiment of the present invention.

Referring to FIG. 16, there is shown an example of a configuration of the processing system 500 according to the second embodiment of the present invention. As described above, the processing system 500 according to the second embodiment is the same as the processing system 100 according to the first embodiment except that it has components which provide new functions. Therefore, only the components added anew and components directly relating to the components are shown in FIG. 16. Description will be made only on these components. Note that different reference numerals have been used in FIG. 16 to designate the same components as those in FIG. 3 and FIG. 15. A management unit 510 of the processing system 500 according to the second embodiment further includes a C1 encoder 525, a C1 encoder buffer 530, and an overwrite state machine 520. In addition, the management unit 510 of the processing system 500 according to the second embodiment has a VRBSR 535 further including a mask unit 555.

The C1 encoder 525 adds a C1ECC to data transmitted from the host device to the management unit 510 after the process by the first processing unit (See FIG. 3) before storing the data into a ring buffer 505. The C1 encoder buffer 530 is located between the first processing unit (See FIG. 3) and the C1 encoder 525 and stores a codeword which is unit data to which the C1ECC is to be added. If data is overwritten in the middle of the codeword, the codeword including the start position of overwriting is once returned and read from the ring buffer 505 to the C1 encoder buffer 530 and new data transmitted from the host device is overwritten on the codeword on the C1 encoder buffer 530.

In the case where data is overwritten on the data stored in the storage medium (See FIG. 3) and the start position of overwriting is located in the middle of a codeword, the overwrite state machine 520 generates a Set_Mask signal for masking the status of a certain segment while the codeword including the start position of overwriting is transferred from the certain segment of the ring buffer 505 storing the codeword to the C1 encoder buffer 530. The mask unit 555 masks the status of the certain segment initialized for the overwriting output from a segment status generation unit 550 with a data read status while the Set_Mask signal is generated. The determination on whether the start position of overwriting is the beginning of the codeword is made for the segment currently indicated by a first counter 512 on the basis of the ring buffer address.

The overwrite state machine 520 also generates a Clear_Mask signal for restoring the status of the certain segment when the codeword including the start position of overwriting is returned and read to the C1 encoder buffer 530 due to a status change by the mask unit 555. The mask unit 555 clears the mask in response to the Clear_Mask signal. If the mask is cleared, the overwriting is started for the codeword, which includes the start position of overwriting, on the basis of the initialized writing status output from the segment status generation unit 550.

Figure 17:
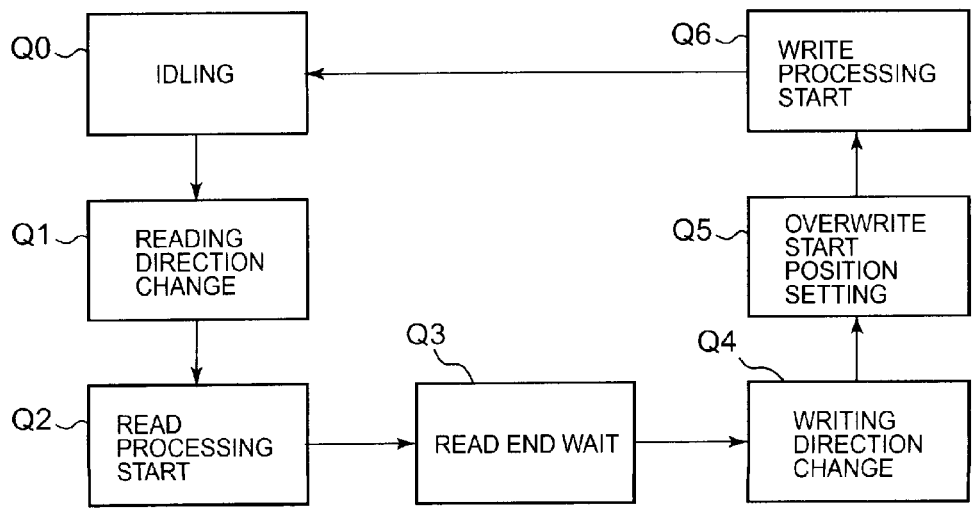
FIG. 17 is a diagram showing a state transition of an overwrite state machine according to the present invention.

FIG. 17 shows various states of the overwrite state machine 520 described above and the transition thereof. The "idling" state in Q0 is an ordinary condition of the overwrite state machine 520. If the process other than overwriting is performed or if the start position of overwriting is the beginning of the codeword even if overwriting is performed, the overwrite state machine 520 is put in this state.

If the overwriting is started and the start position of overwriting is located in the middle of the codeword, the overwrite state machine 520 shifts from Q0 to Q1, namely "reading direction change" state. The overwrite state machine 520 in the Q1 state changes the direction of the internal logic of the management unit 510 from the writing direction to the reading direction and generates a Set_Mask signal for masking the status of the segment currently indicated by the first counter 512 with the status for reading.

Figure 18A:
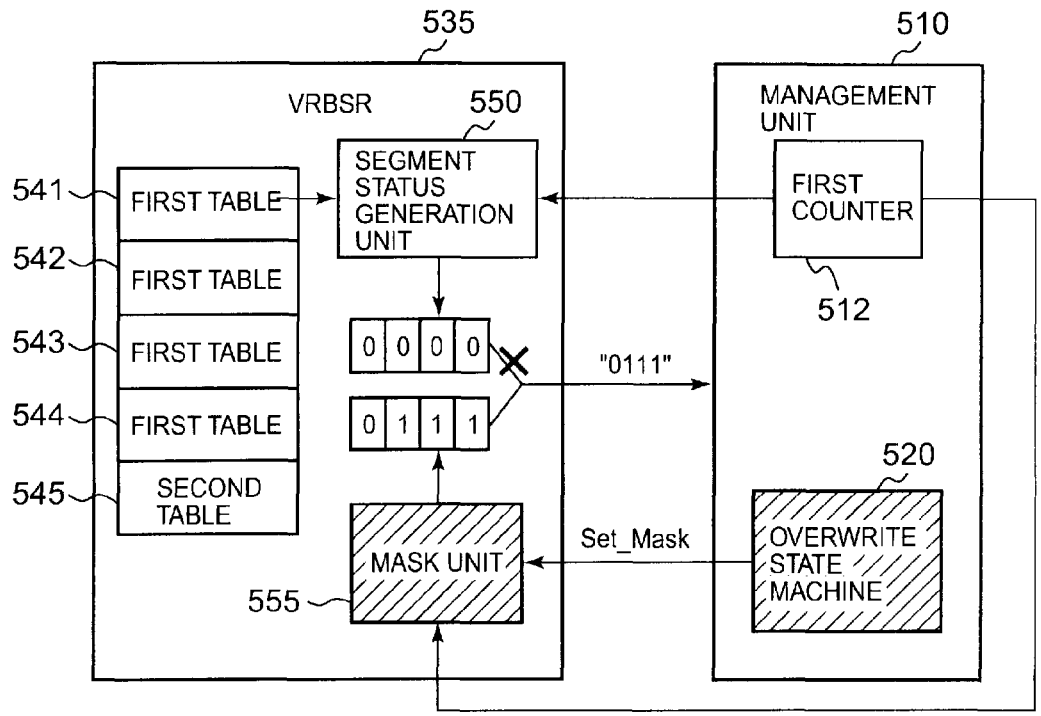
FIG. 18A is a diagram showing a processing system 100 according to the second embodiment of the present invention in masking a status and FIG. 18B is a diagram showing the processing system 100 according to the second embodiment of the present invention when clearing a mask.

FIG. 18A shows a part of the processing system 500 in a situation where the overwrite state machine 520 is put in the Q1 state. Since overwriting is a type of write processing, the plurality of first tables are updated so as to initialize the status of the segment including data of the start position of overwriting and after when the overwriting is started. Therefore, the segment status generation unit 550, which generates a status on the basis of the plurality of first tables, generates a status "0000" for the segment indicated by the first counter 512.

On the other hand, the Set_Mask signal generated by the overwrite state machine 520 is input to the mask unit 555 of the VRBSR 535. The mask unit 555 generates a status for reading "0111," for the segment indicated by the first counter 512 in response to the Set_Mask signal. Then, the mask unit 555 masks the status "0000" generated by the segment status generation unit 550 with the status for reading "0111."

The status for reading "0111" will be described below. The 4-bit signal is composed of bits to which the statuses of processes by the first processing unit, the second processing unit, the third processing unit, and the fourth processing unit shown in FIG. 3 are allocated sequentially from the leftmost bit. The value 1 indicates that the process is completed and the value 0 indicates that the process is not completed yet. As described above in the explanation of the first embodiment, the start condition on the process by each processing unit for the next segment is that the process for the next segment is not completed and the process by a processing unit immediately preceding the processing unit is completed. When the start condition is satisfied, unit data of the next segment is transferred to the processing unit concerned. Therefore, the status for reading "0111" satisfies the start condition of the first processing unit and the data transfer from the ring buffer 505 to the first processing unit, and therefore from the ring buffer 505 to the C1 encoder buffer 530, is started.

Returning to FIG. 17, the overwrite state machine 520 shifts from the Q1 state to a Q2 "read processing start" state unconditionally, and then shifts to a Q3 "read end wait" state. If the overwrite state machine 520 is put in the Q2 state, a transfer of the codeword including the start position of overwriting to the C1 encoder buffer 530 is started and the overwrite state machine 520 shifts to the Q3 state to await the end of the transfer of the codeword including the start position of overwriting.

Upon completion of the transfer, the overwrite state machine 520 shifts to a Q4 "writing direction change" state. The overwrite state machine 520 in the Q4 state changes the internal logic direction of the management unit 510 to the original writing direction and generates a Clear_Mask signal for returning the status to the original status for writing for the segment currently indicated by the first counter 512.

Figure 18B:
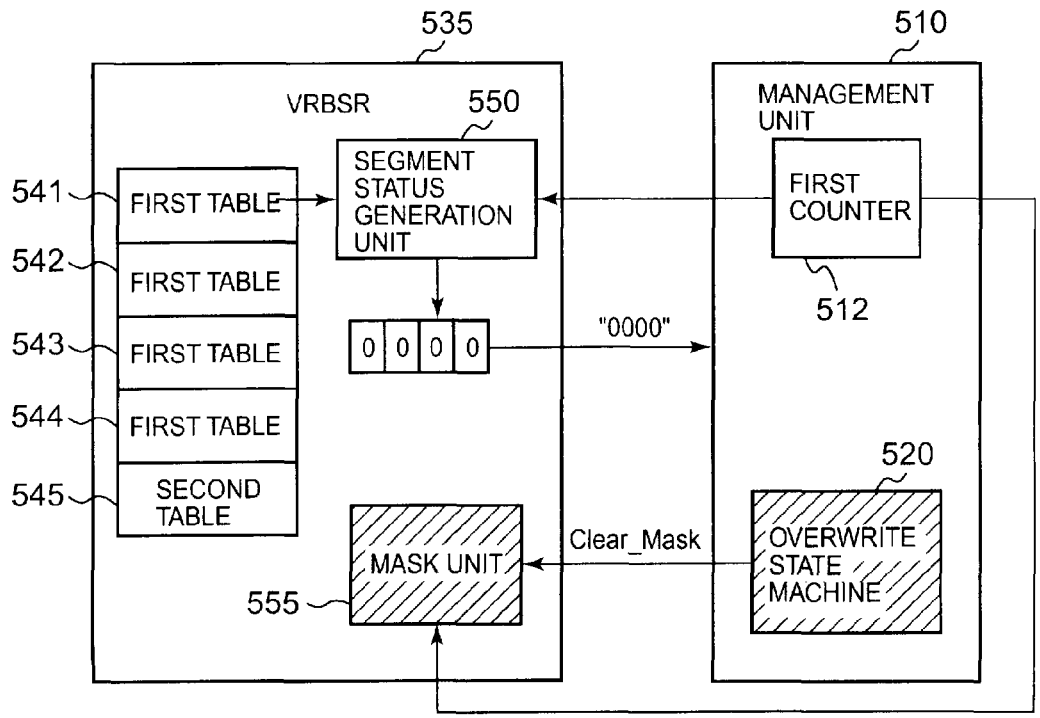

FIG. 18B shows a part of the processing system 500 in a condition where the overwrite state machine 520 is situated in the Q4 state. The Clear_Mask signal generated by the overwrite state machine 520 is input to the mask unit 555 of the VRBSR 535. The mask unit 555 clears the mask of the status "0000" generated by the segment status generation unit 550 in response to the Clear_Mask signal.

Returning to FIG. 17, the overwrite state machine 520 unconditionally shifts from the Q4 state to a Q5 "overwrite start position setting" state and then shifts to a Q6 "write processing start" state. When the overwrite state machine 520 gets to the Q5 state, the address of the start position of overwriting on the ring buffer 505 is copied to the C1 encoder buffer 530 and the start position of overwriting is set to the C1 encoder buffer 530. Thereafter, when the overwrite state machine 520 shifts to the Q6 state, the overwriting is started for the codeword including the start position of overwriting on the basis of the initialized status for writing "0000" output from the segment status generation unit 550. Finally, the overwrite state machine 520 unconditionally returns from the Q6 state to the Q0 "idling" state.

Figure 19:
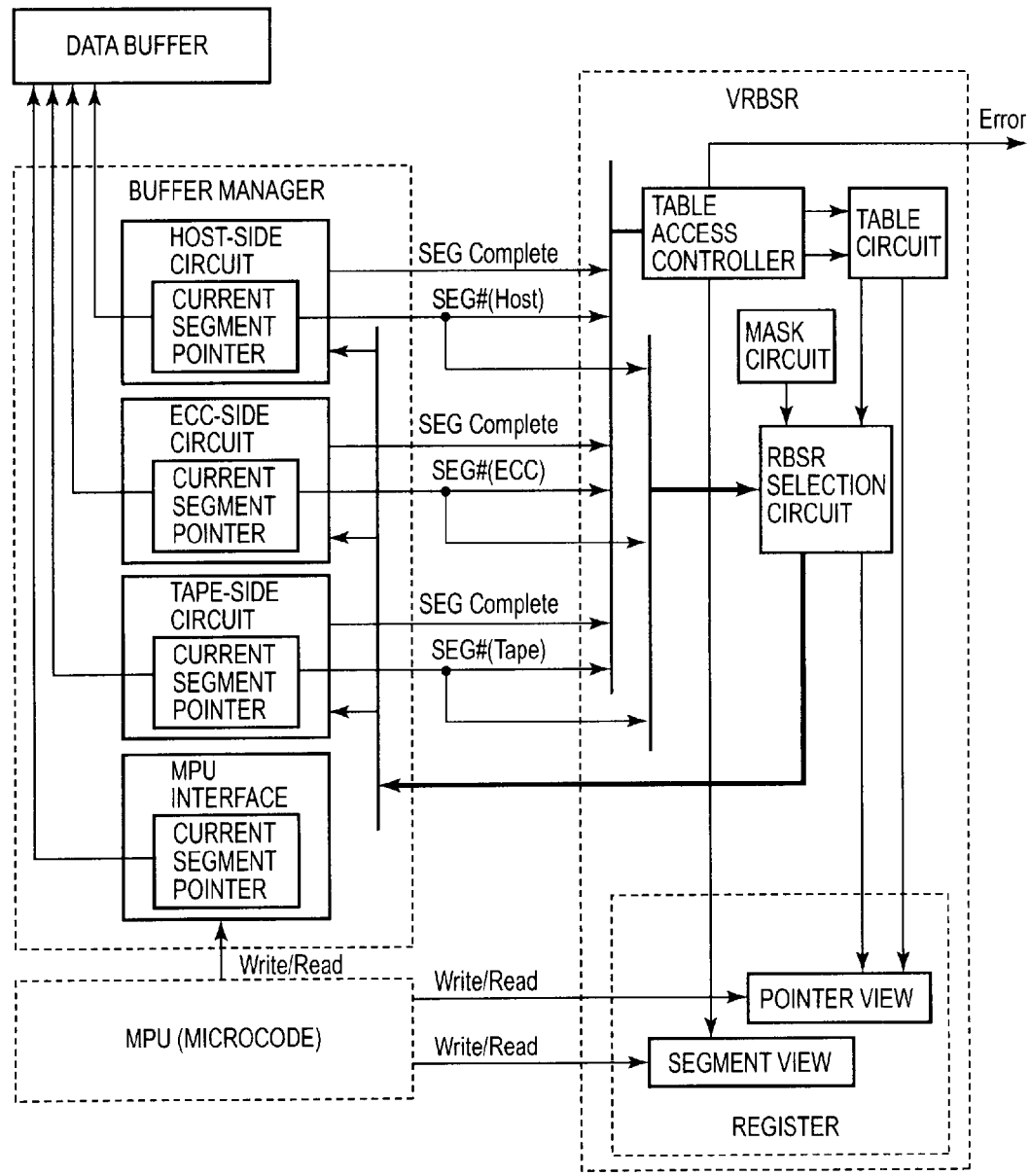
FIG. 19 is a diagram showing an implementation of the processing system 100 according to the present invention.

Subsequently, an implementation of the processing system 100 according to the present invention will be described with reference to FIG. 19 to FIG. 21. FIG. 19 shows the implementation of the processing system 100, with the plurality of processing units which perform the series of processes omitted. In FIG. 19, a data buffer corresponds to the ring buffer and a buffer manager (BMG) corresponds to the management unit. The first counter, the first start determination unit, the first data transfer unit, and the first updating unit of the management unit are implemented as a host-side circuit: similarly, the third counter, the third start determination unit, the third data transfer unit, and the third updating unit are implemented as an ECC-side circuit; and the fourth counter, the fourth start determination unit, the fourth data transfer unit, and the fourth updating unit are implemented as a tape-side circuit. Moreover, the second counter and the second data transfer unit are implemented as an MPU interface unit. The circuits of the BMG and the MPU interface unit each internally have a pointer for indicating the current segment which is a processing object.

The plurality of first tables and second tables, the segment status generation unit, and the mask unit of the VRBSR are implemented as a table circuit, an RBSR selection circuit, and a mask circuit, respectively. In addition, the access control unit of the VRBSR is implemented as a table access control unit in cooperation between hardware and software. Moreover, the pointer view register and the segment view register are implemented as a plurality of registers.

In FIG. 19, an arrow indicates a data flow. A pointer indicating the current segment in each circuit of the BMG is input to the RBSR selection circuit. The RBSR selection circuit obtains a status of the input current segment on the basis of a signal from the table circuit and returns it to each circuit of the BMG Each circuit of the BMG determines whether it is possible to start the transfer of unit data of the current segment on the basis of the received status. Upon completion of the transfer of the unit data, each circuit of the BMG inputs the pointer indicating the current segment and a signal indicating the completion to the table access control unit. The table access control unit determines whether it is appropriate to update the table regarding the current segment in response to the received notification of the completion from each circuit of the BMG. If the table access control unit determines that the update is appropriate, it inputs the update information to the table circuit. On the other hand, if it determines that the update is inappropriate, the table access control unit generates an error signal.

The MPU corresponding to the control unit obtains the status of the current segment by reading out a value of the pointer of the current segment via an MPU interface to get a register value of a segment view corresponding to the value. The MPU then determines whether it is possible to start the transfer of unit data of the current segment on the basis of the obtained status. Upon completion of the transfer of the unit data of the current segment, the MPU inputs the update information to the table circuit via the pointer view register. The value of the segment view register is set by the RBSR selection circuit after the MPU specifies a window in a window register (not shown) and thereupon the value is sent to the RBSR selection circuit as a part of the address indicating a plurality of segments included in the window. The set value of the segment view register is read out or changed by the MPU.

Figure 20:
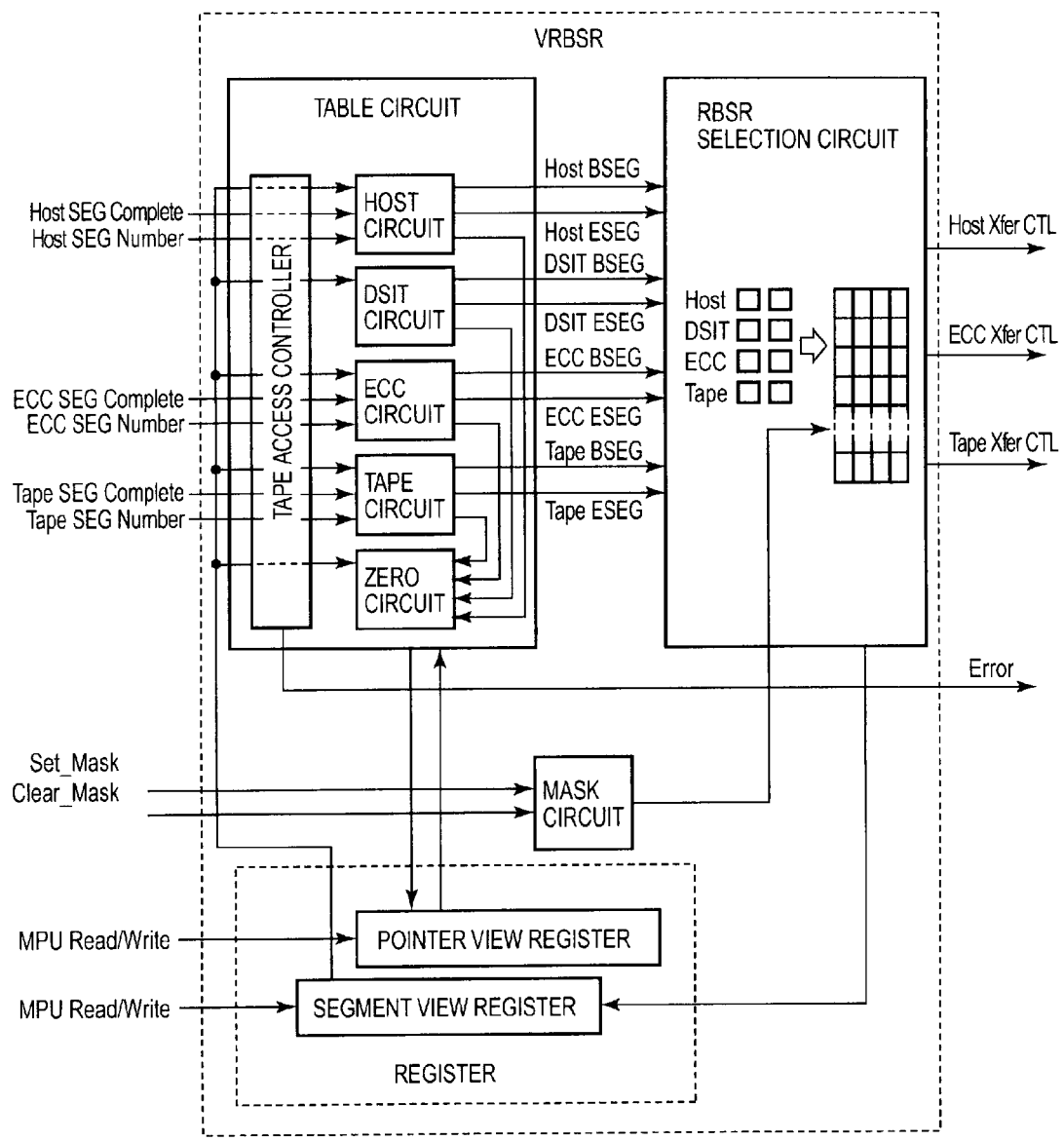
FIG. 20 is a diagram showing an implementation of a VRBSR according to the present invention.

Referring to FIG. 20, there is shown a more detailed implementation of the VRBSR shown in FIG. 19. The table circuit includes a host circuit, a DSIT circuit, an ECC circuit, and a TAPE circuit, which correspond to the plurality of first tables, respectively, and a zero circuit corresponding to the second table. The host circuit, the ECC circuit, and the TAPE circuit receive signals from the host-side circuit, the ECC-side circuit, and the tape-side circuit, respectively, via the table access control unit. In addition, all of the host circuit, the DSIT circuit, the ECC circuit, the TAPE circuit, and the zero circuit are accessed by the MPU via the pointer view register or via the segment view register in order to read out or write the status.

The RBSR selection circuit generates a status for the segment specified by each circuit of the BMG on the basis of the input signals from the host circuit, the DSIT circuit, the ECC circuit, and the TAPE circuit. The generated status is returned to each circuit of the BMG as a transfer control signal or set to the segment view register. The mask circuit masks the status generated by the RBSR selection circuit on the basis of the input Set_Mask signal and the Clear_Mask signal.

Figure 21:
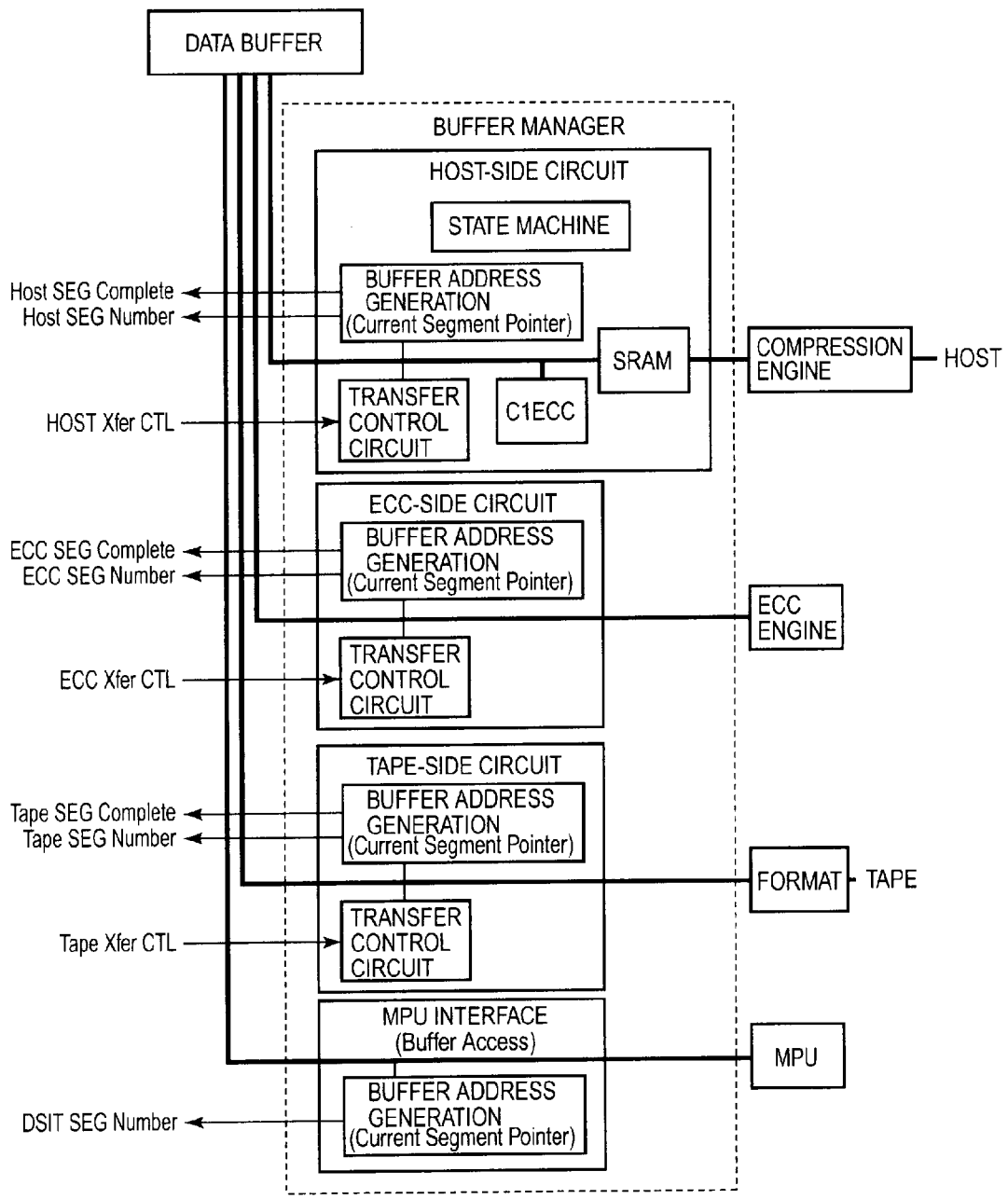
FIG. 21 is an implementation of a management unit according to the present invention.

FIG. 21 shows a more detailed implementation of the BMG shown in FIG. 19. The circuits constituting the BMG are connected to the corresponding processing units, respectively. Specifically, the host-side circuit is connected to an compression engine corresponding to the first processing unit; the ECC-side circuit is connected to an ECC engine corresponding to the third processing unit; the tape-side circuit is connected to a format corresponding to the fourth processing unit; and the MPU interface is connected to an MPU which provides a function of the second processing unit. The circuits of the BMG each internally have a transfer control circuit. The transfer control circuit receives a transfer control signal returned from the RBSR selection circuit and determines whether it is possible to start the transfer of unit data of the current segment. If the transfer control circuit determines that the unit data can be transferred, the circuits of the BMG read out the unit data of the current segment from the data buffer and transfer it to the corresponding processing units.

Figure 23:
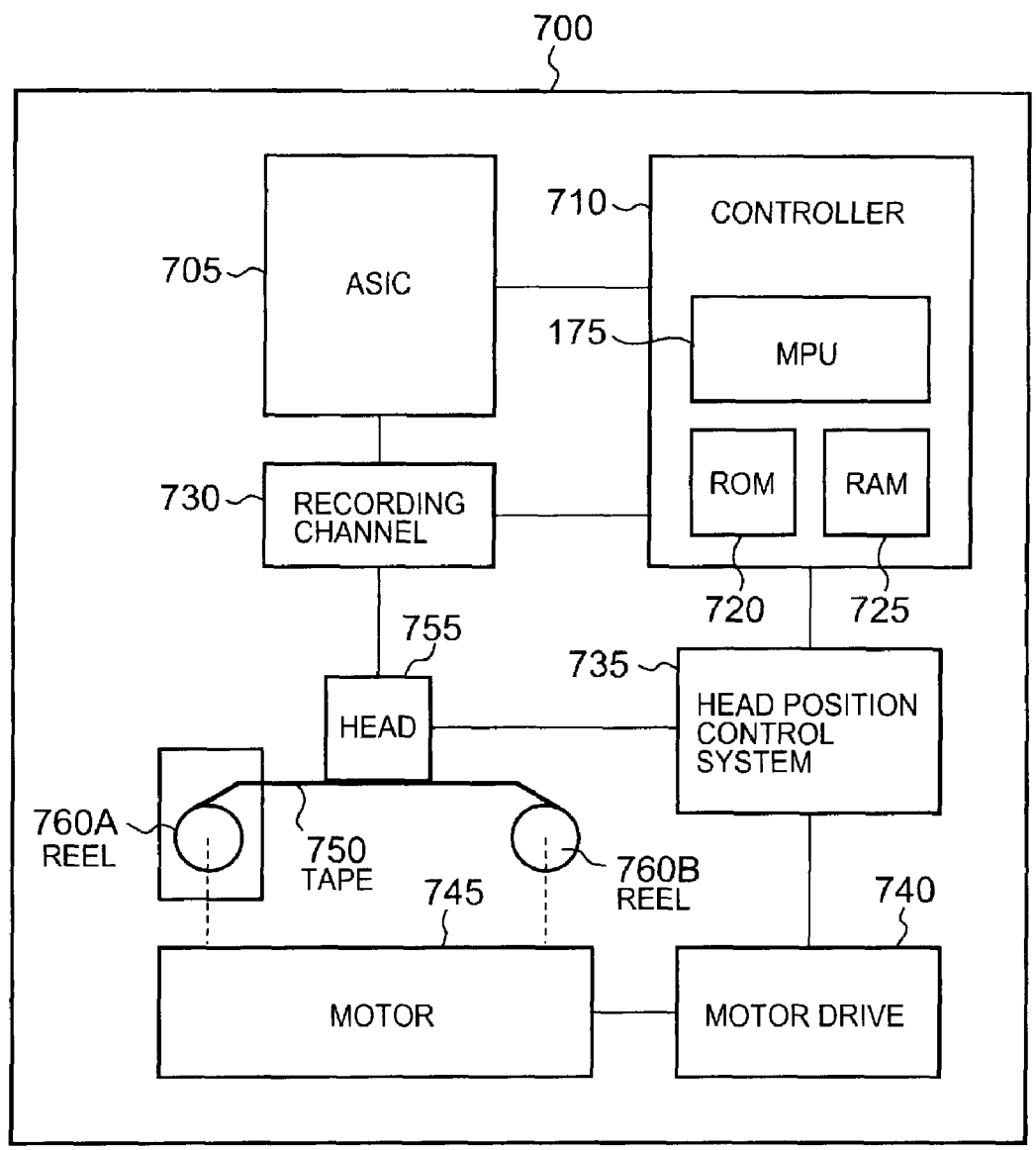
FIG. 23 is a diagram showing an example of a hardware configuration of the storage device according to the present invention.

Referring to FIG. 23, there is shown an example of a hardware configuration of a storage device 700 including the processing system according to the present invention. The storage device 700 includes an ASIC 705 implementing the processing system according to the present invention, a controller 710, a recording channel 730, a head position control system 735, a motor drive 740, a motor 745, a tape 750, a head 755, and reels 760A and 760B. The interface implemented in the ASIC 705 establishes communication with the host device. The interface receives a command for writing user data to the tape 750 from the host device. For example, in the case where the interface communication protocol is implemented in the SCSI, the command corresponds to a Write command. The buffer is a memory for storing data to be written into the tape 750 such as, for example, a DRAM. The data is transferred in an arbitrary length from the host 105 to the drive.

The tape 750 is a tape medium as data recording means. The data passed via the recording channel 730 is written into the tape 750 by the head 755 in units of data sets (for example, 400 KB). The tape 750 is wound around the reels 760A and 760B and moves longitudinally in a direction from the reel 760A to the reel 760B or in the opposite direction thereof with the rotations of the reels 760A and 760B. The motor 745 rotates the reels 760A and 760B.

The controller 710 controls the entire storage device 700. The controller 710 controls data writing or reading to or from the tape 750 according to the command received by the interface from the host device. The controller 710 also controls the head position control system 735 and the motor drive 740. If there is a need to change the track, the head position control system 735 electrically controls the switching of the head 755. The controller 710 monitors (write and read) data in the ASIC 705 and the recording channel 130. Alternatively, the motor drive 740 can be directly connected to the controller 710.

The controller 710 includes an MPU 715, a ROM 720, and a RAM 725. The ROM 720 stores a boot program executed by the MPU 715 on startup of the storage device 700 or a program actuating the storage device 700 after the startup. Moreover, the ROM 720 stores a program for causing the controller 710 to function as the second processing unit 150, the second start determination unit 152, the second updating unit 154, the initialization unit 158, and the adjusting unit 159 described with reference to FIG. 3. Then, the MPU 715 performs these programs using the RAM 725.

Although the present invention has been described by using the preferred embodiments, the technical scope of the invention is not limited to the above described embodiments. It is apparent to those skilled in the art that various alterations or modifications may be made to the foregoing embodiments. Therefore, it is to be understood that such alterations or modifications are included within the technical scope of the present invention.

What is claimed is:

1. A processing system comprising:
a buffer composed of a plurality of segments which store data, which is to be input to said processing system, in transactions in an order of inputting, respectively;
a plurality of processing units which perform a series of processes in a given order for said data;
a plurality of first tables corresponding to said plurality of processing units, respectively, said first tables each storing a processing status of each of said series of processes including:
beginning information which indicates a beginning segment among said plurality of segments at continuous addresses completed in a process by a corresponding processing unit;
end information which indicates an end segment among said plurality of segments; and existence information which indicates one of a presence and an absence of segments completed in said process by said corresponding processing unit;
a status generation unit which generates said processing status for said segment specified with reference to said plurality of first tables in response to an inquiry for said processing status of said series of processes for which said segment is specified, and
a management unit which manages a data transfer between said buffer and said plurality of processing units so that said series of processes are performed in a given order based on said processing status of said series of processes retained in said plurality of first tables.

2. A processing system according to claim 1,
wherein said management unit manages said data transfer between said buffer and said plurality of processing units by specifying a next segment to be processed for each of said plurality of processing units to inquire for a processing status at said status generation unit and determining whether said processing status satisfies a start condition on said process by said processing unit.

3. A processing system according to claim 2, wherein said management unit transfers unit data of said next segment to be processed to said processing unit for which said start condition is determined on condition that said processing status of said series of processes for said next segment to be processed is such that said process by said processing unit for which said start condition on said process is to be determined is not completed and said process by a processing unit immediately preceding said processing unit is completed.

4. A processing system according to claim 1, wherein said management unit updates a corresponding first table in response to completion of said process by each of said processing units, and
wherein said processing system includes an access control unit which detects an update which causes a segment not processed yet by a corresponding processing unit to exist between said beginning segment indicated by said beginning information on an arbitrary one of said first tables and said end segment indicated by said end information on said first table and then generates an error signal.

5. A processing system according to claim 4, wherein said access control unit detects an update where said beginning information and said end information do not change before and after said update of an arbitrary one of said first tables, and then generates an error signal.

6. A processing system according to claim 1, wherein said buffer is a ring buffer, said processing system includes a control unit, and said control unit changes said beginning information of each of said plurality of first tables in such a way that said beginning information indicates a segment located one or more segments ahead of said beginning segment before data is written into all segments of said ring buffer.

7. A storage device comprising:
a storage medium capable of writing and reading data in given units;
a buffer composed of a plurality of segments each of which stores unit data in said given units in one of a writing and a reading order before one of writing into said storage medium and after reading from said storage medium;
a plurality of processing units which perform a series of processes in a given order for said unit data;
a plurality of first tables corresponding to said plurality of processing units, respectively, said first tables each storing a processing status of each of said series of processes including:
beginning information which indicates a beginning segment among said plurality of segments at continuous addresses completed in a process by said corresponding processing unit;
end information which indicates an end segment among said plurality of segments; and
existence information which indicates one of a presence and an absence of segments completed in said process by said corresponding processing unit;
a status generation unit which generates said processing status for said segment specified with reference to said plurality of first tables in response to an inquiry for said processing status of said series of processes for which said segment is specified, and
a management unit which manages a data transfer between said buffer and said plurality of processing units so that said series of processes are performed in a given order based on said processing status of said series of processes retained in said plurality of first tables.

8. A storage device according to claim 7, wherein said management unit manages data transfer between said buffer and said plurality of processing units by specifying a next segment to be processed for each of said plurality of processing units to inquire for the processing status at the status generation unit and determining whether the processing status satisfies a start condition on the process of said processing units.

9. A storage device according to claim 7, further comprising:
a second table which stores a processing status of each of said series of processes including:
beginning information indicating a beginning segment among a plurality of segments at continuous addresses not completed in any of said processes by said plurality of processing units;
end information indicating an end segment among said plurality of segments; and
existence information which indicates a presence or absence of segments not completed in any of said processes by said plurality of processing units; and
an adjusting unit which adjusts a speed of data writing or data reading to or from said storage medium with reference to said second table.

10. A storage device according to claim 8, wherein said management unit includes:
- an encoder which adds a row error correcting code to data before writing said data into said buffer;
- an encoder buffer which stores a codeword which is unit data to which said row error correcting code is added; and
- an overwrite state machine which generates a signal, in case of overwriting data in a middle of said codeword stored in said storage medium, while said codeword in said middle of which data is overwritten is transferred from a certain segment of said buffer storing said codeword to said encoder buffer and wherein said storage device includes a mask unit which masks said processing status of a certain segment initialized for overwriting output from said status generation unit with a data read processing status while said signal is generated.

11. A computer-implemented method for performing a series of processes for unit data stored in segments of a buffer in a given order, said method comprising:
- generating, by a computing device, processing status of a next segment to be processed for each of a plurality of processing units with reference to a plurality of first tables;
- determining, by said computing device, whether said processing status of said next segment to be processed satisfies a start condition on a process by each of said plurality of processing units; and
- reading, by said computing device, unit data from said next segment to be processed of said buffer and transferring it to said processing unit for which said start condition is determined in response to determination that said start condition on said process is satisfied in said determination step,
- wherein each of said plurality of processing units performing a series of processes has a corresponding first table which stores a processing status of each of said series of processes including:
- beginning information which indicates a beginning segment among a plurality of segments at continuous addresses completed in said process by said processing unit;
- end information which indicates an end segment among said plurality of segments; and
- existence information which indicates a presence or an absence of segments completed in said process by said processing unit.

* * * * *